(12) United States Patent
Armstrong-Muntner

(10) Patent No.: US 11,854,134 B2
(45) Date of Patent: Dec. 26, 2023

(54) INFORMATION DISPLAY USING ELECTRONIC DIFFUSERS

(71) Applicant: Apple Inc., Cupertino, CA (US)

(72) Inventor: Joel S. Armstrong-Muntner, San Mateo, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/069,922

(22) Filed: Dec. 21, 2022

(65) Prior Publication Data
US 2023/0117997 A1 Apr. 20, 2023

Related U.S. Application Data

(62) Division of application No. 16/779,207, filed on Jan. 31, 2020, now Pat. No. 11,538,206, which is a division of application No. 13/954,577, filed on Jul. 30, 2013, now Pat. No. 10,553,002.

(60) Provisional application No. 61/696,042, filed on Aug. 31, 2012.

(51) Int. Cl.
G06T 11/60 (2006.01)
G03B 15/05 (2021.01)
G03B 11/00 (2021.01)
G03B 9/00 (2021.01)
H04N 23/56 (2023.01)
H04N 23/62 (2023.01)
H04N 23/72 (2023.01)
H04N 23/74 (2023.01)
H04N 23/75 (2023.01)
H04N 23/611 (2023.01)
G09G 5/02 (2006.01)
(Continued)

(52) U.S. Cl.
CPC ............... G06T 11/60 (2013.01); G03B 9/00 (2013.01); G03B 11/00 (2013.01); G03B 15/05 (2013.01); H04N 23/56 (2023.01); H04N 23/611 (2023.01); H04N 23/62 (2023.01); H04N 23/72 (2023.01); H04N 23/74 (2023.01); H04N 23/75 (2023.01); G03B 2215/0592 (2013.01); G06V 40/16 (2022.01); G09G 5/02 (2013.01); G09G 5/10 (2013.01)

(58) Field of Classification Search
CPC .. H04N 23/56; H04N 23/611; H04N 23/2362; H04N 23/72; H04N 23/74; H04N 23/75; G03B 15/05; G03B 2215/0592
See application file for complete search history.

(56) References Cited

U.S. PATENT DOCUMENTS 9,041,046 B2 5/2015 Phang et al.
10,553,002 B2 2/2020 Armstrong-Muntner
11,538,206 B2 12/2022 Armstong-Muntner
(Continued)

FOREIGN PATENT DOCUMENTS

WO 2012097665 7/2012

Primary Examiner — Kelly L Jerabek
(74) Attorney, Agent, or Firm — Alexander A. Knapp; Kowert, Hood, Munyon, Rankin & Goetzel, P.C.

(57) ABSTRACT

Embodiments of systems and methods for using electronic diffusers to implement message indicators are described. A segment of a diffuser attached to an electronic device is configured to indicate an informational message in response to signals that result in a change to an optical property. A set of information to be displayed using the segment is determined, and a signal is transmitted to the segment to display the information.

20 Claims, 24 Drawing Sheets

(51) Int. Cl.
*G09G 5/10* (2006.01)
*G06V 40/16* (2022.01)

(56) References Cited

U.S. PATENT DOCUMENTS

| | | |
|---|---|---|
| 2007/0024822 A1 | 2/2007 | Cortenraad et al. |
| 2008/0049446 A1 | 2/2008 | Harbers et al. |
| 2008/0165146 A1 | 7/2008 | Matas |
| 2008/0304819 A1* | 12/2008 | Tolbert .................. G03B 17/18 396/448 |
| 2009/0243493 A1 | 10/2009 | Bergquist |
| 2009/0262085 A1 | 10/2009 | Wassingbo et al. |
| 2009/0278979 A1 | 12/2009 | Bayerl et al. |
| 2009/0305732 A1 | 12/2009 | Marcellino et al. |
| 2010/0097293 A1 | 4/2010 | Mcmahon |
| 2010/0118060 A1 | 5/2010 | Huang et al. |
| 2010/0265435 A1 | 10/2010 | Hwang et al. |
| 2011/0025906 A1* | 2/2011 | Shurboff .................. H04N 23/71 348/E5.037 |
| 2011/0123184 A1 | 5/2011 | Mather et al. |
| 2011/0134503 A1 | 6/2011 | Shim et al. |
| 2011/0188106 A1 | 8/2011 | Bae et al. |
| 2011/0286199 A1 | 11/2011 | Miikkola et al. |
| 2012/0026574 A1 | 2/2012 | Bae et al. |
| 2012/0105306 A1 | 5/2012 | Fleck |
| 2012/0127128 A1 | 5/2012 | Large et al. |
| 2012/0162268 A1 | 6/2012 | Fleck et al. |
| 2013/0195435 A1 | 8/2013 | Yost et al. |
| 2013/0314582 A1* | 11/2013 | Masser .................. H04N 23/56 348/340 |
| 2013/0321340 A1 | 12/2013 | Seo et al. |

* cited by examiner

T1: Flash illumination starts

T2: Flash illumination ends delta1: diffuser switching time (max opacity to max transparency)

delta2: diffuser switching time (max transparency to max opacity)

INFORMATION DISPLAY USING ELECTRONIC DIFFUSERS

PRIORITY CLAIM

The application is a divisional of U.S. patent application Ser. No. 16/779,207, filed Jan. 31, 2020, which is a divisional of U.S. patent application Ser. No. 13/954,577, filed Jul. 30, 2013, now U.S. Pat. No. 10,553,002, which claims benefit of priority to U.S. Provisional Application No. 61/696,042, filed on Aug. 31, 2012, which are hereby incorporated by reference herein in their entirety.

TECHNICAL FIELD

This disclosure relates generally to electronic devices comprising, or configured to use, optical components such as cameras and flashes.

DESCRIPTION OF THE RELATED ART

Digital still and/or video cameras are often incorporated in a number of electronic devices, including mobile phones, tablet computers, laptop computers and desktop computers. Some electronic devices may even have multiple cameras—e.g., a tablet device may include a front-facing camera intended mainly for video chats or other communications, and a back-facing camera for higher quality photographs and/or higher definition video. In some devices, flashes may be built-in, or external flash devices may be used in conjunction with one or more digital cameras of the device. Such camera-containing devices may also include fairly sophisticated image processing software and camera control software. In many cases, at least a portion of the encasing or outer cover of the device that is located in front of the camera lens may be constructed of transparent material such as glass. As a result, during periods when an embedded camera is in an "on" or enabled state, its lens is typically exposed to most or all of the light incident on the transparent covering. Although such levels of exposure to the external light may be ideal for various types of photographs or videos, for other functions more control of the amount of light reaching the camera lens and sensor may be useful. Similarly, the transparent encasing of a flash device may provide only limited control over the flash's illumination.

SUMMARY OF EMBODIMENTS

Embodiments of systems and methods for using electronic diffusers for camera-based ambient light sensing, enhanced flash features and/or message display are described. According to one embodiment, an electronic device may comprise a digital camera, one or more layers of a diffuser positioned between a lens of the camera and the exterior of the electronic device, one or more processors and a memory. At least one optical property (such as diffusivity, transparency, transmittance or color) of at least one layer of the diffuser may be controllable via one or more electrical signals. In response to a determination to configure the camera in ambient light sensing (ALS) mode, program instructions present in the memory when executed by a processor may initiate a generation of a signal to set a particular optical property of the diffuser to a particular level or value. The instructions may determine, or participate in a determination of, a metric of ambient light from at least a portion of an image detected by the digital camera using light passing through the diffuser with the particular optical property set to the particular level. The diffuser may comprise, for example, one or more segments of a polymer dispersed liquid crystal (PDLC) device, a curved metal blind deposited on a glass substrate, a photochromic thin film, or a suspended particle device.

According to another embodiment, an electronic device may comprise one or more processors, a memory, a digital camera configurable in a plurality of modes of operation, including one or more photography modes and one or more background modes, and one or more layers of a diffuser positioned between a lens of the digital camera and the exterior of the electronic device, wherein one or more optical properties of the diffuser is controllable via one or more signals. The memory may comprise program instructions. When executed on the one or more processors, in response to determining that the digital camera is configured in a background mode, the instructions may initiate a generation of a signal to the diffuser to provide, using one or more optical properties of the diffuser that are modified by the signal, a privacy screen for users or other bystanders. Any images captured through the diffuser by the camera while the diffuser is in use as a privacy screen may be sufficiently distorted (e.g., blurred or diffused) to make the captured scene unrecognizable. Thus, the change to the optical property or properties of the diffuser may prevent the camera's image sensor from detecting an undistorted image. The appearance of the diffuser in the privacy screen mode may also serve as an indication to a user of the electronic device that the camera is not in a photography mode. Such an indicator may serve to inform the user that the user's privacy is not being violated by an unexpected use of the camera for photography.

According to at least one embodiment, an electronic device may comprise one or more processors, a memory, a digital camera with a diffuser positioned between the camera lens and the exterior of the device, and one or more supplementary light sources (such as light emitting diodes) positioned within a threshold distance from the diffuser, such that at least a portion of the light emitted by the supplementary light source passes through the diffuser to the exterior of the device. The memory may comprise program instructions that, when executed on the one or more processors, initiate a generation of one or more signals to at least one of: (a) the diffuser, or (b) the one or more supplementary light sources, to provide a visual indication of a state of one or more applications installed on the electronic device.

According to another embodiment, an electronic device may comprise one or more processors, a memory and one or more diffusers or diffuser segments attached to an encasing of the electronic device. One or more optical properties of a particular diffuser or diffuser segment, such as diffusivity, opacity, transparency, transmittance, or color, may be controllable via an electrical signal such as a change to a voltage applied across electrodes of the diffuser. The memory may comprise program instructions that when executed on the one or more processors determine contents of one or more messages to be displayed using the particular diffuser or segment, and initiate a generation of a signal to the particular diffuser or segment to modify an optical property of the particular diffuser or segment to indicate at least a portion of the contents of the one or more messages. For example, a user-initiated diffuser display configuration request may be received, indicating one or more information data sources for the messages. Contents of the messages that are displayed during a given time interval may be determined based at least in part from sources indicated in the configuration request. For some electronic devices that include a user interface such as a touch-screen with a primary display, the diffuser segment or segments may represent a second type of display. Both the primary display and the diffuser segments may be attached to the encasing of the device—for example, the diffuser segments may be attached to a bezel area, or to a different face of the encasing than the primary display. In some cases, the diffuser may overlap at least in part with the primary display. During a given time interval, the primary display and the diffuser display may be used for different purposes—e.g., a logo or state information of a selected application, or artwork (such as a book cover for an electronic reader application, an album cover for a music-related application, a game-related visual for a gaming application) may be displayed via the diffuser, while the primary display may be used for user I/O related to a different application. Diffusers located in the light paths of cameras and/or flashes may also be used for information display, e.g., during times when the camera functionality is not being used. In some embodiments, the contrast between the diffuser and the surrounding portions (or the background portions) of the encasing or bezel may be used for providing or enhancing the informational content (e.g., using silhouetting, positive versus negative space contrasts, and/or additional lighting from the side using LEDs or other light sources). In various embodiments, informational messages may be displayed using the diffuser itself, e.g., where the diffuser or a portion of the diffuser forms the message, without relying on the visibility of other portions of the electronic device (such as additional displays) through the diffuser layer.

According to some embodiments, an electronic device may comprise one or more processors, a memory, a digital camera and a diffuser positioned between the camera lens and the exterior of the device. One or more optical properties of the diffuser may be controllable via a signal. The memory may comprise program instructions. When executed on the one or more processors, the instructions may, in response to determining that a flash is to be used to provide lighting for an image to be obtained using the digital camera, initiate a generation of one or more signals to the diffuser to limit a time period during which the diffuser remains at a desired level of transparency. The time period may, for example, be scheduled to coincide with the flash illumination event, such that the camera sensor's read-in captures the exterior scene only while the scene is illuminated.

According to one embodiment, an electronic device may comprise one or more processors, a memory, a digital camera and a diffuser positioned between the camera lens and the exterior of the device. One or more optical properties of the diffuser may be controllable via a signal. The memory may comprise program instructions. When executed on the one or more processors, the instructions may, in response to a determination to modify a light gathering field of view of the digital camera, initiate a generation of one or more signals to the diffuser to change an optical property (such as diffusivity) of at least a portion of the diffuser to modify the effective light gathering field of view or angle of view.

According to some embodiments, an electronic device may comprise one or more processors, a memory, and a flash unit configurable for use with a digital camera. A diffuser comprising one or more layers may be positioned between the light source of the flash and the exterior of the electronic device. One or more optical properties of the diffuser may be controllable via a signal. The memory may comprise program instructions. When executed on the one or more processors, the instructions may, in response to determining that the flash unit is to be activated to provide lighting for an image to be obtained using the digital camera in accordance with a particular flash mode, initiate a generation of one or more signals to the diffuser to change one or more optical properties (such as the diffusivity) of one or more of the diffuser layers.

Figure 1:
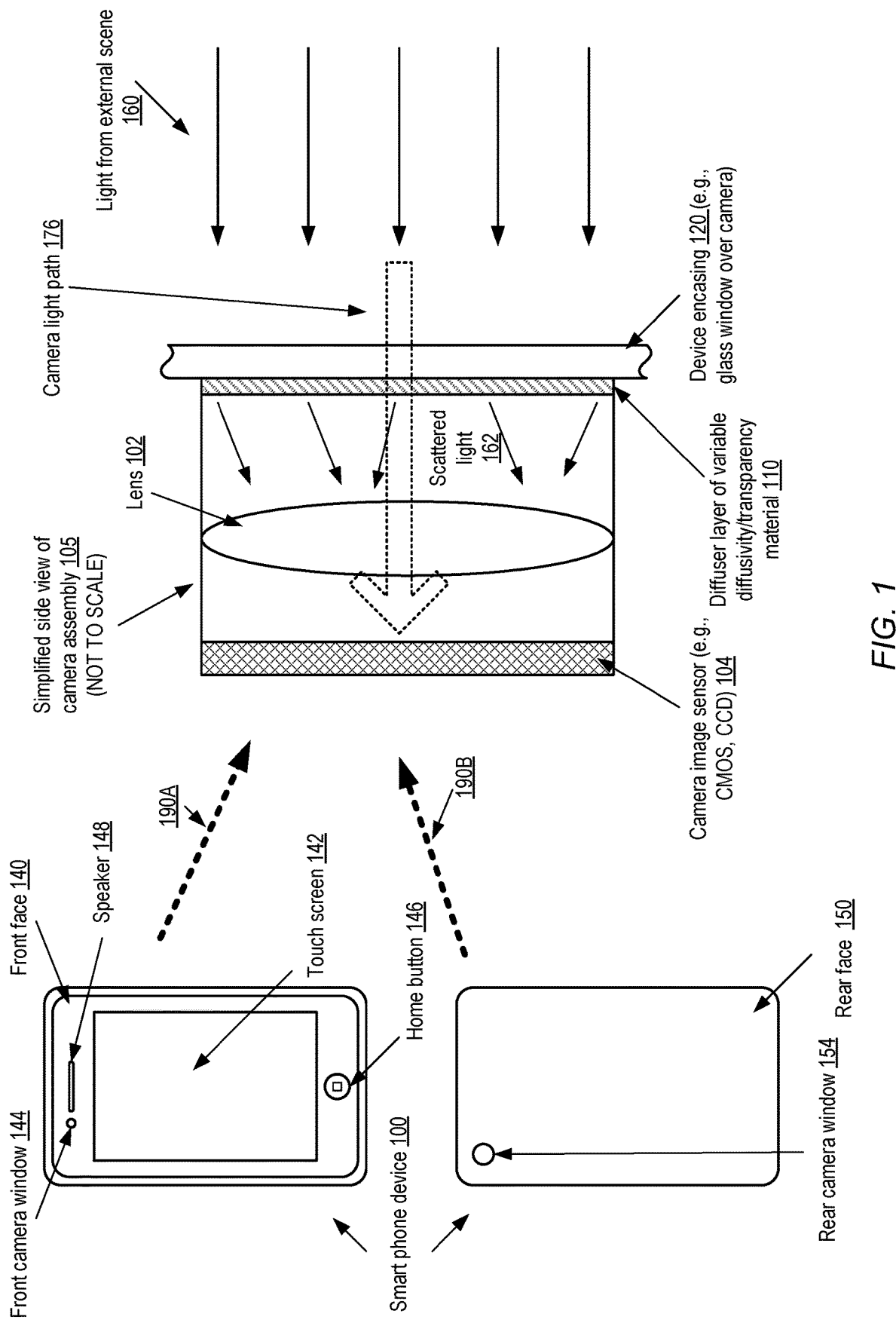
FIG. 1 is a block diagram illustrating an example smart phone electronic device equipped with two digital cameras and respective diffuser layers, according to at least some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units. . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Various embodiments of systems and methods of using electronic diffusers, comprising one or more layers of materials whose optical properties can be modified using electrical signals, for enabling ambient light sensing using digital cameras incorporated within electronic devices are described. The term "diffuser" may be used herein synonymously with the term "electronic diffuser". In at least some embodiments, diffusers may be used for additional functions as well, such as for providing privacy screens and/or privacy indicators to users of the electronic devices, providing indicators of application state or subcomponent state, displaying various types of messages, to enhance the aesthetic appeal of the electronic device, and/or for supporting various flash photography features. Diffusers may be used in a number of different types of camera-equipped electronic devices or components in various embodiments, including mobile phones, tablet computing devices, personal digital assistants, audio playback and/or recording devices, electronic book (e-book) reading devices, portable multifunctional devices, electronic gaming or video gaming devices, cable set-top boxes, satellite set-top boxes, smart televisions, laptop computers, desktop or deskside computers, or servers. In the context of electronic devices that support flash illuminators for their cameras, a different diffuser may be used for a flash device in at least some embodiments than the diffuser that is used for the camera for which the flash device provides illumination. In some embodiments, diffusers may be used in standalone cameras or standalone flash devices. In one embodiment, a diffuser may be used to improve the functionality of non-camera based ambient light sensors, e.g., by modifying or enhancing the angles over which the ambient light is collected by an ambient light sensor using a photodiode.

Camera-as-ALS Functionality Using Diffusers

According to at least some embodiments, an electronic device may comprise one or more processors, memory coupled to the processors, a digital camera, and a diffuser comprising one or more layers of variable diffusivity material positioned between a lens of the digital camera and an exterior of the electronic device. For example, in some implementations where light reaches the camera lens through a transparent glass or plastic window forming part of the encasing or covering of the electronic device, the diffuser layer or layers may be attached to the window. One or more properties of at least one layer of the diffuser, including for example the extent to which incident light is diffused or scattered as it passes through the layer, the transmittance of the layer, the opacity of the layer, the transparency of the layer, the color of the layer, and/or the extent to which the layer appears clear or "frosted", may be controllable via one or more electrical signals. The type of signal or signals required may vary in different embodiments, and may for example be generated by a control circuit coupled to one or more conductive elements of the layer. In one simple implementation an optical property may be controlled simply by varying the voltage difference between two electrodes of a diffuser layer, for example. The control circuitry used to transmit the signals may be programmable via instructions stored in the memory and executable by the one or more processors—e.g., it may be possible to initiate, as a result of executing some set of instructions, a signal to change one or more properties of the layer. The diffuser layer material may be attached or bonded to the interior or exterior of the encasing of the electronic device in some embodiments using any appropriate technique, such as with the help of a transparent adhesive material or via one or more mechanical connectors placed such that the pathway between incident light from the exterior of the device through the layer to the camera lens is not blocked (or is blocked to a very limited extent). In other embodiments the diffuser layer may be inserted mechanically or electromechanically, on demand and/or programmatically, between the camera lens and the encasing of the electronic device, or on the exterior of the electronic device. It is noted that the terms "diffuser" or "diffuser layer" may be used generally herein to refer to layers of materials for which one or more optical properties (e.g., transmittance, transparency or color) can be changed via electrical signals, and that the use of such terms is not restricted to materials that only change their diffusivity. In at least some implementations, changes in two or more optical properties of a diffuser layer may be at least somewhat correlated—e.g., as the extent to which light is scattered as it passes through the layer (i.e., as the diffusivity changes), the layer may appear more opaque, or its color may change.

The digital camera of the electronic device may be configurable to be placed in any of several modes of operation in some embodiments. In one embodiment, an ambient light sensing (ALS) mode may be supported, in which the camera is intended to determine one or more metrics of the amount of ambient light in the vicinity of the electronic device. Such metrics may be used, for example, to control the backlighting or brightness of one or more displays, keyboards, touch-pads, or other components of the electronic device (or of other electronic devices) in some embodiments. Transitions between the various modes of camera operation may be triggered by several different kinds of events or monitoring in different operations—e.g., based on input provided by a client or user, based on a detection that a camera application or an image-processing application is being executed on the processor(s), based on a detection that a certain amount of time has elapsed since a particular application was last invoked or an image or video was last generated, and so on. For example, in one implementation where an ALS mode is supported, the camera may transition from a photography mode to the ALS mode if no photograph or video image has been captured for the last five minutes, and the camera may transition from the ALS mode to a photography mode whenever a client invokes or activates a camera application.

When program instructions in the memory of the electronic device determine that the camera is to be configured in ALS mode, the instructions may initiate a generation of a signal to set at least one optical property (e.g., the diffusivity) of a diffuser layer to a threshold level. In embodiments where the property to be modified by the signal is the diffusivity, for example, a number of distinct diffusivity levels may be possible, or a continuum across a range of diffusivities may be possible, in different embodiments depending on the nature of the material used, the control circuitry details, and other details of the implementation. (Similar choices from among a discrete set of values or levels, or across a continuum of values or levels, may be possible for other optical properties such as color or transparency in some embodiments.) From among the various levels or values along the continuum, a threshold value may be selected for supporting ambient light sensing. The threshold diffusivity level may result in a reduction of the contrast between different parts of the scene captured or detected by the camera's light sensor, as compared to the contrast that would have been detected between the same parts of the scene if the layer had remained fully or largely transparent. As a result of the reduction in contrast or "smoothing" of the external scene as detected by the camera's light sensor, it may be less computationally expensive to determine the metric of ambient light—e.g., image processing software of the electronic device may be able to use simpler algorithms to obtain an average ambient light metric based on some central subset of pixels of the smoothed image detected by the camera's sensor, instead of conducting detailed analysis of various contrasting sections of a corresponding raw or un-smoothed image. The reduction in the amount of computation may be accompanied by a reduction in the amount of power consumed, and/or in the amount of time required to determine the ambient light conditions in some implementations. The metric of the ambient light determined with the help of the diffuser layer may be used in some embodiments to adjust the brightness or other properties of a display, touch-screen, keyboard or other peripheral device. In some embodiments, the metric of ambient light may be used to control the brightness and/or backlighting of components or devices external to the electronic device comprising the camera—e.g., the brightness of one or more television screens or displays of a different device in the vicinity of the particular electronic device responsible for ambient light sensing may be adjusted based on the ambient light measurement. Depending on the implementation, different metrics or units may be used for ambient light measurements, such as lumens, lux, footcandles, candelas, or any appropriate custom unit selected by the manufacturer of the electronic device. In at least some implementations, the instructions may not determine an absolute quantity of light in such units, but may instead compare the light level received through the diffuser to previously-determined standard measures to arrive at the ambient light measurement. Some of the diffuser's optical properties that may be modified may represent ratios (e.g., transmittance may be measured in some implementations as the ratio of the amount of light received through the diffuser from a light source, to the original amount of light transmitted towards the diffuser from the light source). In some embodiments, both camera-based ambient light sensing and a conventional (non-camera) ambient light sensor may be implemented in the same electronic device, such that either or both techniques may be used at any given time.

It is noted that in some embodiments, the day-to-day use of the diffuser (e.g., by purchasers of the electronic device) for ambient light sensing, or for any of the other types of functions described below, may not involve measurements of the precise extent to which the diffuser's optical properties change when a given signal is applied. For example, during design and development of an electronic device, the extent to which a given applied voltage changes the transmittance or diffusivity of the material may be observed and/or measured, so that at least an approximate function relating the voltage to the optical properties of interest can be determined. During design and testing, the applicability of the function over long periods of use may be verified. After the device design and testing has been completed and the devices is sold to customers, the voltage may be changed during general use, e.g., to switch in and out of ALS mode, assuming that the function is still applicable, without requiring any calibration or measurement of the corresponding change in optical properties in several embodiments. In other embodiments and for certain types of electronic devices, the devices may be equipped with one or more sensors to verify that the optical property changes are in fact occurring as expected, or one or more image analysis algorithms or calibration applications may be used to verify the expected property changes.

Privacy Screen and Privacy Indicator

In at least one embodiment, an electronic device may include a digital camera configurable in a plurality of modes of operation, including one or more photography modes and one or more background or passive modes. In the photography modes, the camera may be used primarily to obtain still or video images to be viewed or displayed by human users, while in the background modes the camera may be used primarily for one or more other functions such as ambient light sensing, motion detection, and/or for participating in the display of state information associated with one or more subcomponents of the electronic device or with one or more applications executable at the electronic device. Such a digital camera may be referred to as a multi-modal digital camera herein. The electronic device may include a diffuser (e.g., a layer of variable transparency or variable diffusivity material) positioned between a lens of the digital camera and the exterior of the electronic device, e.g., in order to accomplish some or all of the background mode functionality.

The electronic device with the multi-modal digital camera may comprise one or more processors coupled to a memory storing program instructions in some embodiments. The instructions, when executed on the processor or processors, may be able to determine whether the digital camera is configured in a photography mode or in a background mode. In response to determining that the digital camera is configured in a background mode, the instructions when executed may initiate a generation of a signal to the diffuser to provide, using one or more properties of the diffuser that are modified by the signal, a privacy screen. When configured as a privacy screen, the diffuser may distort incoming light received by the camera to such an extent that any image captured by the camera sensor is rendered unrecognizable as a representation of the exterior of the camera—that is, it may be impossible to recognize any figures or objects because of the diffusion and/or blurring introduced by the diffuser. In addition, the external appearance of the diffuser when configured as a privacy screen may serve an indication to a user of the electronic device that the camera is not in a photography mode. Thus, for example, if the encasing of the device comprises a normally transparent window of glass or some other transparent material over the lens of the camera, and the diffuser is attached to the window, the perceived opacity or color of the window may be changed when the camera is in a background mode. This type of change may make it easy for a user of the electronic device, or for any other bystander, to determine that the camera is currently not engaged in photography. Thus, a change in the visual properties of the electronic device (e.g., of a portion of the device between the digital camera components and the exterior of the device) induced by signaling the diffuser may serve as an indicator that privacy of the user or bystander is not being violated by taking video or still images of the scene. Such a clearly visible privacy indicator may, for example, encourage those users concerned about possible loss of privacy as a result of inadvertent photography to use the background modes of operation of the digital camera more frequently.

General-Purpose State/Information Indicator

As noted above, in some embodiments an electronic device may include a digital camera configurable in a plurality of modes of operation, including one or more photography modes and one or more background or passive modes. The electronic device may include a diffuser (e.g., a layer of variable transparency or variable diffusivity material) positioned between a lens of the digital camera and the exterior of the electronic device, such that one or more optical properties of the diffuser are controllable via one or more signals. In one implementation, the diffusivity of the material may be changed via the one or more signals, i.e., the extent to which incident light is scattered as it passes through the material may be controlled via the signals, and this capability may be used to implement some subset of the background functionality. As pointed out above, properties such as the diffusivity and transparency of the material may be related in some embodiments, i.e., as the extent to which light is scattered is increased, the material may appear more opaque or may appear "frosted" as opposed to looking transparent. In some implementations, the color of at least a portion of the layer may also or instead be controllable via a signal or signals. In at least one embodiment, the diffuser-equipped electronic device may also comprise one or more supplementary light sources such as light-emitting diodes (LEDs) or other light-emitting devices positioned in the vicinity of the diffuser layer, such that while the light emitting devices are not directly visible from the exterior of the electronic device, at least a portion of the light emitted affects the exterior appearance of the portion of the encasing to which the diffuser layer is attached.

The electronic device with the multi-modal digital camera may comprise one or more processors coupled to a memory storing program instructions in some embodiments. The instructions, when executed on the processor or processors, may be able to determine whether the digital camera is configured in a photography mode or in a background mode. In response to determining that the digital camera is configured in a background mode, the instructions when executed may initiate a generation of one or more signals to at least one of: (a) the diffuser, or (b) the one or more supplementary light sources, to provide a visual indication of a state of one or more applications installed on the electronic device, or of a state of one or more subcomponents of the electronic device. Thus, in one simple example, a battery-monitoring application or sensor may be able to determine a measure of the remaining charge of a battery powering the electronic device. When the instructions determine that the camera is in a background mode such as an ALS mode, an indication of a low charge status of the battery as determined by the monitoring application or sensor may be displayed by initiating a signal to make a red LED glow, so that a red glow is visible through the diffuser layer. In some implementations it may be possible to simultaneously utilize the diffuser for the background function of the camera (such as ALS) and for the display of state information. In other implementations the use of the diffuser for background functions may be time-multiplexed with its use for displaying state information, such that at a given point in time the diffuser is used either for the background functionality or for the state display. The purpose for which the layer is being used may be switched back and forth according to some desired schedule in some implementations, e.g., the layer may be used for ALS for one second, for application state display for the next five seconds, then again for ALS for one second, then again for application state display for five seconds, and so on. In some implementations it may be possible to use the layer of variable transparency material itself as an application state indicator, and supplementary light sources such as LEDs may not be required. In at least one implementation, a plurality of supplementary light sources may be used so that more complex indicators of state information may be displayed (such as color C1 indicating that up to N outstanding emails have been received at the electronic device, color C2 if more than N but less than 5N outstanding e-mail messages have been received, and so on). State information for several different applications may be displayed using the light-emitting devices and/or the diffuser in some embodiments, e.g., by time-multiplexing the state information for the different applications. In at least one implementation, the instructions may initiate signals to display application state indicators intermittently even if the digital camera is being used in a photography mode.

Diffuser as a Design/Aesthetic Element Extending Beyond the Camera Light Path

In at least one embodiment, an electronic device may include, in addition to a multi-modal digital camera, one or more processors and a memory, one or more diffuser layers positioned in locations other than the light path of the camera—e.g., the bezel or border sections of the electronic device that are not part of the touch screen or display of the device may include one or more diffusers. The encasing or cover of the electronic device may thus be considered to consist of at least two sections or portions in such an embodiment—a first section (such as a camera window) through which light is collected by the camera, and a second section that is not along the path of the light reaching the camera's optical sensor. In embodiments where diffusers are attached to the inside of the encasing, they may be positioned not just behind the first section but also behind at least a portion of the second section. In some implementations the diffuser may be attached to only the second section, and not to the camera-covering section. One or more signals may be used to control various properties of the diffuser, including for example the diffusivity, the color, the opacity or transparency, or the extent to which the layer appears "frosted".

The electronic device may be configurable in a number of modes, including one or more active modes in which an application or applications installed on the device are running in the foreground and/or responding to user input, and one or more passive modes in which for example a user is not currently providing input. In one embodiment, in response to determining that the device is currently in a particular mode (such as a passive mode), program instructions present in the memory may determine one or more message indicators to be displayed during the time that the device is in the particular mode. In other embodiments, messages or state information may be displayed regardless of the mode of operation of the electronic device. The message indicators may include, for example, state information for one or more subcomponents of the device (such as a battery), state information of one or more applications (e.g., how many e-mails from a selected group of users have been received and remain unread), advertisements or logos, and so on. The instructions when executed may initiate a generation of one or more signals to the diffuser to display the message indicators. Various approaches may be used to display the message indicators—e.g., some portions of the layer may be made more opaque than others, some portions may be made to appear a different color than others, and so on. In some embodiments some representation of text (e.g., letters, numerals or other symbols) may be displayed, by varying the optical properties of some portions of the diffuser to represent an approximation of a "background color" or "white space", while the optical properties of other portions are set to represent an approximation of "foreground text". Depending on the properties of the diffuser in different embodiment, the contrast and precision with which text can be displayed may vary. In some embodiments the message indicators may be displayed intermittently or according to some designated schedule, instead of being displayed continuously. In at least one implementation, multiple independently-controlled sections of the diffuser material may be deployed, so that different message indicators can be displayed simultaneously. In at least one implementation, at least a portion of the material may be used for displaying message indicators even when the device is actively being used for certain types of applications, e.g., during periods of time when a user is providing input to the device or receiving feedback to input provided to the device.

Diffuser as a Virtual Shutter for Enhanced Flash Synchronization

In at least one embodiment, a diffuser may be used as a virtual shutter to help synchronize flash illumination bursts with the time for which the camera sensor is exposed to the scene intended to be illuminated. For example, some electronic devices comprising digital cameras (or standalone digital cameras) may allow users to use illuminating devices called flashtubes or flash lamps that produce extremely intense light for a very short period of time. In such a scenario, one or more layers of the diffuser material may be utilized to implement a synchronized virtual shutter that is configurable to control the time for which the digital camera's optical sensor receives light from the scene illuminated by the flash device, such that the duration for which the sensor is exposed to the incoming light (or the sensor's "read-in" period) overlaps to some desired level with the duration for which the scene is illuminated. The diffuser or diffusers may be positioned between the camera lens and the encasing or cover of the electronic device in which the camera is incorporated, or on the exterior of the portion of the encasing covering the camera. For example, if the scene is expected to be illuminated between time t1 and time t2, the diffuser may be sent one or more signals to (a) ensure complete or near-complete opacity until t1+delta1 (b) rapidly switch to complete or near-complete transparency at t1+delta1 and (c) rapidly switch back to complete or near-complete opacity at t2−delta1, where delta1 and delta2 are very small relative to (t2−t1). In some cases it may even be feasible to set delta1 and/or delta2 to zero. By switching to complete or near-complete transparency only during the times when the scene to be captured is well illuminated, the virtual shutter may enhance the quality of the image captured, relative to the image that may have been captured if the camera's optical sensor had received input from unlit or partially-lit portions of the scene. In some embodiments, the diffuser that is employed for flash synchronization may also be used for other purposes such as ALS, so that for example when the flash is not being used the diffuser may be maintained in a diffuse mode suitable for ALS instead of being configured to maximum opacity.

Diffusers for Flash Windows

In some embodiments, one or more diffusers may be used specifically for flash units or devices, instead of or in addition to being used for the digital camera for which the flash unit is usable to illuminate scenes. For example, some electronic devices include, for a given digital camera incorporated in the device, a corresponding flash unit or illuminator also incorporated or built in the device. One transparent window (e.g., of glass or plastic) may cover the camera, and a separate window may cover the flash device. As described above, a diffuser layer or layers may be positioned along the inward path taken by exterior light to reach the camera lens and camera sensor in some embodiments, e.g., a diffuser may be attached to the inside or outside of the camera window. In at least some embodiments, one or more diffuser layers may also or instead be positioned along the outward path from the light source of the flash device (e.g., an LED or a Xenon tube or lamp) to the scene to be illuminated. For example, a diffuser may be attached to the interior or exterior of the flash window. For ease of discussion, a diffuser used for the inward light path of the camera may be referred to herein as the camera diffuser, and a diffuser used for the outward light path of the flash may be referred to herein as the flash diffuser.

A flash diffuser may be used in several ways to enhance the quality of the still or video photography supported by an electronic device. For example, in some embodiments a number of factors may be taken into account by the camera management software or imaging software stored in the memory of the electronic device to select one flash mode from among several flash modes. Such factors may, for example, include measurements of ambient light (e.g., obtained from a standalone ALS or from an ALS-enabled camera), detection of contrast differences and shadows in different portions of the exterior scene, output from face detection algorithms, proximity sensor output indicating how far away a likely subject of the photography is positioned from the camera and flash, motion detector outputs, orientation detector outputs, and so on. It may be possible, using such factors, to determine for example whether the illumination from a flash should ideally be focused centrally or be spread over a wider "cone of illumination", or whether "fill-flash" (a technique to brighten foreground areas that are detected to be in shadow) may be beneficial. Thus, instructions in the memory of the electronic device, when executed on one or more processors of the electronic device, may be able to determine (a) that flash illumination should be used and (b) a preferred flash illumination mode to be used. By initiating the generation of appropriate signals to one or more flash diffusers, optical properties of the flash diffuser may be modified by the executable instructions to support the desired flash illumination mode. For example, in one embodiment, it may be possible to increase the diffusivity or opacity of some portions of the flash diffuser(s), such that more of the flash's light is concentrated in a narrow cone of illumination, or to darken portions of the flash diffuser through which light may be transmitted towards "less interesting" portions of the scene such as floors or ceilings. In some embodiments, diffusers may also or instead be implemented for standalone or external flash devices (i.e., the use of diffusers may not be restricted to only those flash illuminators that are incorporated within the same device as the camera).

In at least some embodiments, a given camera may be associated with a corresponding flash unit, a camera diffuser, and a flash diffuser. These four components (the camera, the flash, and the two diffusers) may be used collectively in some embodiments to arrive at the best possible image or video quality. For example, the camera diffuser may enable the detection of ambient light by the camera, which may in turn help in determining the optimum flash mode, and the optimum flash mode may be implemented with the help of the flash diffuser. In other embodiments, a flash diffuser may be used even if the camera does not have an associated camera diffuser. In electronic devices with multiple cameras and/or multiple flash units, respective diffusers may be implemented for any combination of the cameras and flashes.

Diffusers for Non-Camera Ambient Light Sensors

In one embodiment, a diffuser may be implemented for a traditional ambient light sensor, e.g., a sensor implemented using a photodiode rather than a digital camera. It may be possible to change the angle of view or field of view (i.e., the extent of the exterior scene from which light is detected) of the traditional sensor by modifying the optical properties of the diffuser in such embodiments. For example, by increasing the diffusivity (or the extent to which light is scattered by the diffuser), the relative impact on the ambient light measurement of light sources that are positioned in the periphery of the surroundings of the electronic device as viewed along a central axis emanating from the ambient light sensor, versus the impact of light sources close to the center of the surroundings relative to the axis, may be varied. Accordingly, an adaptive ambient light sensing technique may be implemented with the help of the diffuser in such embodiments, in which for example after an initial reading of the ambient light level is processed, and analysis indicates that it may be appropriate to take some additional readings using a different effective light gathering field of view, one or more adjustments to the properties of the diffuser may be made and corresponding new readings of ambient light obtained based on the light detected through the modified diffuser. Such diffuser-based adjustments of the field of view may be implemented for camera-enabled ALS, as well as for traditional non-camera ALS, in some embodiments.

Example Diffuser-Equipped Electronic Devices

FIG. 1 is a block diagram illustrating an example smart phone electronic device equipped with two digital cameras with respective diffusers, according to at least some embodiments. Smart phone device 100 comprises a front facing camera as well as a back-facing camera in the depicted embodiment. When viewed from the front (e.g., from the side in which the touch screen 142 is visible), a front camera window 144 may be visible, e.g., next to a speaker 148. The front face 140 may also include various other components in different embodiments, such as home button 146, and (when the smart phone is in an active or on state) various icons representing different applications installed on the phone. In at least some embodiments, the rear face 150 of the smart phone may include a somewhat larger rear-facing camera window 154. Thus, the front-facing camera and the rear-facing camera may differ from one another in various properties in some embodiments, such as the lens size, the camera sensor size, the maximum resolution of still or video images that can be captured, the speed with which the image is captured, the extent to which the camera's lens can be moved back and forth for focusing purposes, and so on.

In the depicted embodiment, a respective diffuser layer may be positioned between the lens of each camera and the corresponding window (i.e., the transparent portion of the encasing of the phone through which light is captured by the camera). A simplified side cross-sectional view of the camera assembly 105 is shown, applicable to either the front camera or the rear camera (as indicated by the dashed arrows 190A and 190B). As indicated by the arrow 176 labeled "camera light path", light from the external scene 160 flows through the window or encasing 120, through the diffuser layer 110 of variable diffusivity/transparency material, and through the lens 120 to the camera image sensor 104 (e.g., a charge-coupled device (CCD) or a complementary metal oxide semiconductor (CMOS) sensor). One or more optical properties of the diffuser may be changed by issuing a signal (such as a particular voltage level applied to two electrodes embedded in the diffuser) in the depicted embodiment. The signal may be initiated as a result of the execution of program instructions by one or more processors of smart phone device 100 (the processors are not shown in FIG. 1 for clarity). As shown, the incident light 160 is scattered or diffused to a desired extent by manipulating the properties of the diffuser, resulting in scattered light 162 reaching the lens 102. Accordingly, one or more characteristics of the image detected by sensor 104, such as the contrast between different portions of the image, or the colors of different parts of the image, may be modified programmatically. In addition to changing the properties of the detected image, the external appearance of the window or device encasing 120 next to which the diffuser is positioned may also be altered as a result of the signal or signals initiated programmatically in at least some embodiments.

In various embodiments, the properties of the diffuser 110 may be changed in order to support any combination of various types of functions, such as ambient light sensing, privacy indicators, state information display, and/or enhanced flash photography functions. For example, in the depicted embodiment, the program instructions may determine, based on one or more factors, that a particular camera (either the front-facing camera, the rear-facing camera, or both) is to enter an ambient light sensing (ALS) mode of operation. In response to a determination to configure the camera in ALS mode, the instructions may initiate a generation of a signal to set a property such as diffusivity of the diffuser 120 to a particular threshold level. The instructions may further determine a metric of ambient light (i.e., light 150 corresponding to the scene in front of the camera window) from at least a portion of an image detected by the camera using light 162 received through the diffuser. The measurement of ambient light may then be used for any desired purpose, e.g., to adjust the brightness of the touch screen 142, or one or more keyboards linked to the smart phone 100, or to adjust the brightness level or backlighting of other devices (such as a television set located in the same room as the phone). Thus, for example, when a user of the smart phone 100 moves from a brightly lit environment to a darker environment, the screen brightness of the phone may be adjusted automatically to provide a better user experience.

As noted above, both the front-facing and the rear-facing cameras may have corresponding diffusers 120 in some embodiments. The two diffusers may be used independently of each other in some implementations—e.g., one may be used for ALS while the other is used for displaying state information of one or more applications or subcomponents of the phone. If only one of the cameras is being used for photography, the other may concurrently be used for ALS in one implementation. In some embodiments, programmatic interfaces (such as "settings" controls of a camera application) may be implemented to allow users to specify the types of functions for which a particular camera may be used. In one implementation, the default mode of operation of one or both cameras may be set to ALS mode, such that whenever the device detects that the camera is not being used for photography, and has not been used for photography for a particular time period, the mode may be switched to ALS if it is not already ALS. In some implementations, if a device has multiple cameras, only a subset may be equipped with a diffuser 110.

The placement of the diffuser 110 with respect to the camera lens 102 and the encasing or window 120 may be accomplished using any of a number of techniques in different embodiments. For example, a transparent adhesive may be used to attach the diffuser to the window, or the diffuser may be held in place by one or more fasteners that do not obstruct the path between the lens and the exterior of the smart phone 100. In some embodiments, instead of being attached or positioned as shown in FIG. 1, the diffuser may be build in to the encasing—e.g., at least a portion of the encasing may be constructed of variable-diffusivity material—or the diffuser may be attached to the exterior of the encasing. A number of different placement choices for diffusers are described below in further detail, with reference to the discussion of FIG. 6A-6H. In some cases, as also described below in conjunction with the description of FIG. 10, diffusers may positioned in several locations of the electronic device—e.g., there may be one section of diffuser material on the light path 176 to the lens 102, and additional sections that do not lie along that path.

The manner in which ambient light levels are detected may differ in various embodiments. For example, in one embodiment, image processing software executable on the processors of smart phone 100 may use an algorithm that uses only a subset of the detected image, such as a small number of pixels towards the center of the detected image, instead of the entire image for ALS purposes. Such reduction in image processing (from the entire image to a subset) may be enabled as a result of the "smoothing", reduction in contrasts between different portions of the image, and/or distortions that result from the change to the optical properties of the diffuser when the camera enters ALS mode. As noted above, the reduction in processing may help to reduce power consumption, and/or increase the speed with which ALS metrics are obtained. In other embodiments, the entire image may still be used for ALS.

In at least some embodiments, the process of detecting ambient light may be iterative or adaptive under certain conditions. Thus, for example, if the image processing software initially detects a sudden change in ambient light levels, e.g., from very bright to very dark, the signals being generated to the diffuser may be modified so that a more fine grained measure of ambient light can be obtained. In very bright light conditions, the diffuser may be configured to a "high scattering" setting, for example, in which very little of the ambient light is allowed to pass through without scattering. If the phone 100 is moved to a very dark environment, the "high scattering" setting may no longer be appropriate, as very little light at all may reach the camera sensor 104. Accordingly, upon detecting the sudden change from very bright to very dark, the software may change the signal to the diffuser such that the diffuser setting changes to "low scattering", so that more light passes through without scattering, and a more accurate determination of ambient light may be made.

In at least some embodiments, the angular acceptance or field of view of the camera may be varied using the diffuser 110 for ALS purposes. For example, in typical phone cameras, the default field of view of the camera is fairly narrow (such as 30 degrees around the center of the light stream incident on the lens 102). However, for ALS purposes, where in many cases the lighting source in a room may lie outside such a small field of view, it may be possible to enhance the field of view by adjusting the diffuser properties. That is, it may be possible to detect light sources positioned at wider angles with respect to the camera when the level of scattering provided by the diffuser is increased, than at lower levels of diffusivity or when the diffuser is effectively transparent. To help capture information about more light sources, the image processing software may generate signals to increase the scattering level of the diffuser under certain conditions (e.g., when an initial analysis suggests that there may be such light sources, or when the software is unable to detect a light source sufficient to obtain an ALS metric with the current scattering level). In at least some embodiments, detecting such light sources may increase the accuracy of the measurement of ambient light. Such adaptive measurements of ambient light based on changing angular acceptance may also or instead be implemented for traditional (non-camera based) ambient light sensors in some embodiments.

In at least some embodiments, the variation in diffusivity that can be attained by varying the signal to the diffuser may be used to obtain more than one "read" or data point for ambient light sensing. For example, one image of the surroundings may be obtained at a high scattering or a high diffusivity setting, in which a fairly wide field of view is captured. A second image of the surroundings may be obtained at a lower scattering of lower diffusivity setting; this second image may for example be localized to a cone of the scene centered on the user's face. Face detection techniques of the image processing software may be used to determine whether it is possible or desirable to use such a second image centered on the user's face in some embodiments. In one embodiment, other sensor data obtained from the phone 100, such as from a motion detecting sensor that indicates that the phone is being held upright and steady (and is therefore probably being held in front of the user's face) may also be used to determine whether it is advisable to use a second image based on a different diffusivity level than the first. In scenarios where multiple images are used, the image processing software may also be capable of determining how much weight is to be given to each of the images when determining the measurement of ambient light. For example, if a face is detected, the particular image that is centered on the face may be given higher weight than any other image in some implementations, since the user's perception of ambient light may be based more on how much light is reaching (and hence being reflected from) the user's face than on any other light sources that the camera may be able to detect.

Figure 2:
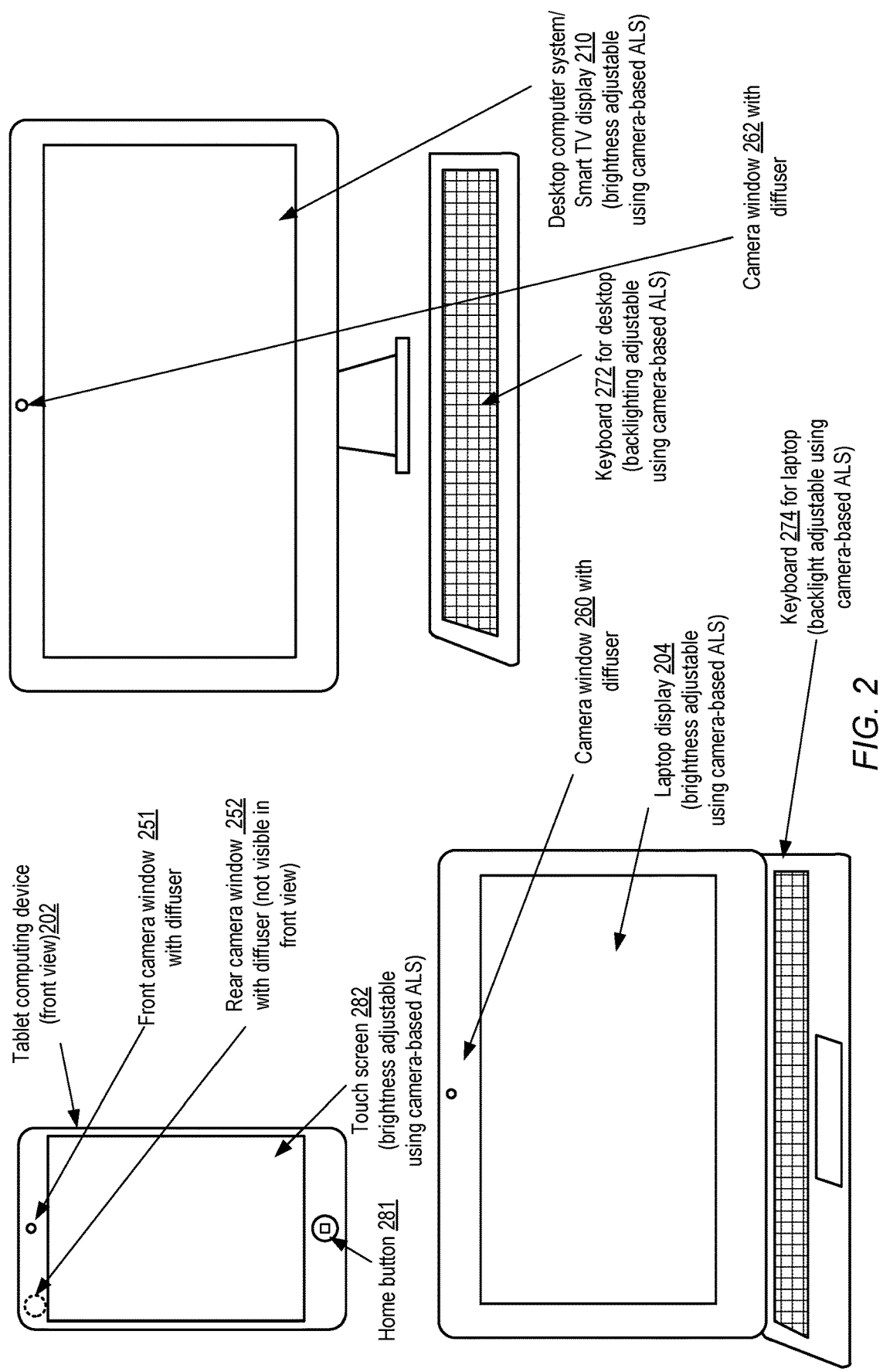
FIG. 2 illustrates several examples of camera-equipped electronic devices in which diffusers may be used for ambient light sensing and other functions, according to at least some embodiments.

FIG. 2 illustrates several camera-equipped electronic devices in which diffusers may be used for ambient light sensing and/or other functions, according to at least some embodiments. A tablet computing device 202 may include a front-facing camera and a back-facing camera in the depicted embodiment, in a manner similar to the smart phone device 100 of FIG. 1. The front camera window 251 (to which a diffuser is attached) is visible in the illustrated front view of tablet 202; the rear camera window 252, which is not visible in the front view, is indicated using dotted lines and also has a diffuser. One or both of the cameras of tablet 252 may have ALS functionality enabled with the help of a respective diffuser in the depicted embodiment, and the ALS feature of the camera may be used to adjust the brightness of touch screen 282 based on the level of ambient light detected.

A laptop device with display 204 may include a camera in one embodiment. A diffuser may be placed between the camera window 260 of the laptop and the camera lens in the depicted embodiment. The camera may be configurable for ALS, and the results of the ALS may be used to adjust the brightness of display 204 and/or the backlighting of laptop keyboard 274. Similarly, a desktop computer system with display 210 (or a smart TV display) may be equipped with a diffuser-enhanced camera in some embodiments. The diffuser may be positioned between the camera window 262 of the display and the lens of the camera. In ALS mode, the diffuser may be used to determine a measure of the ambient lighting in a manner similar to that described above with respect to FIG. 1's phone 100, and the results of the ALS may be used to adjust the brightness of display 210 and/or the backlighting of keyboard 272.

It is noted that in some environments, there may be several devices or peripherals present in the same room whose brightness and/or backlighting may be adjustable based on ambient light conditions. In such a scenario, any given electronic device that comprises an ALS-capable camera may be usable to control the brightness or backlighting of some or all of the various peripherals in some embodiments. For example, ambient light level information determined using a tablet may be used to adjust the brightness of a TV in the same room in one embodiment (e.g., using network communication between a remote control application running on the tablet, and the TV).

Figure 3:
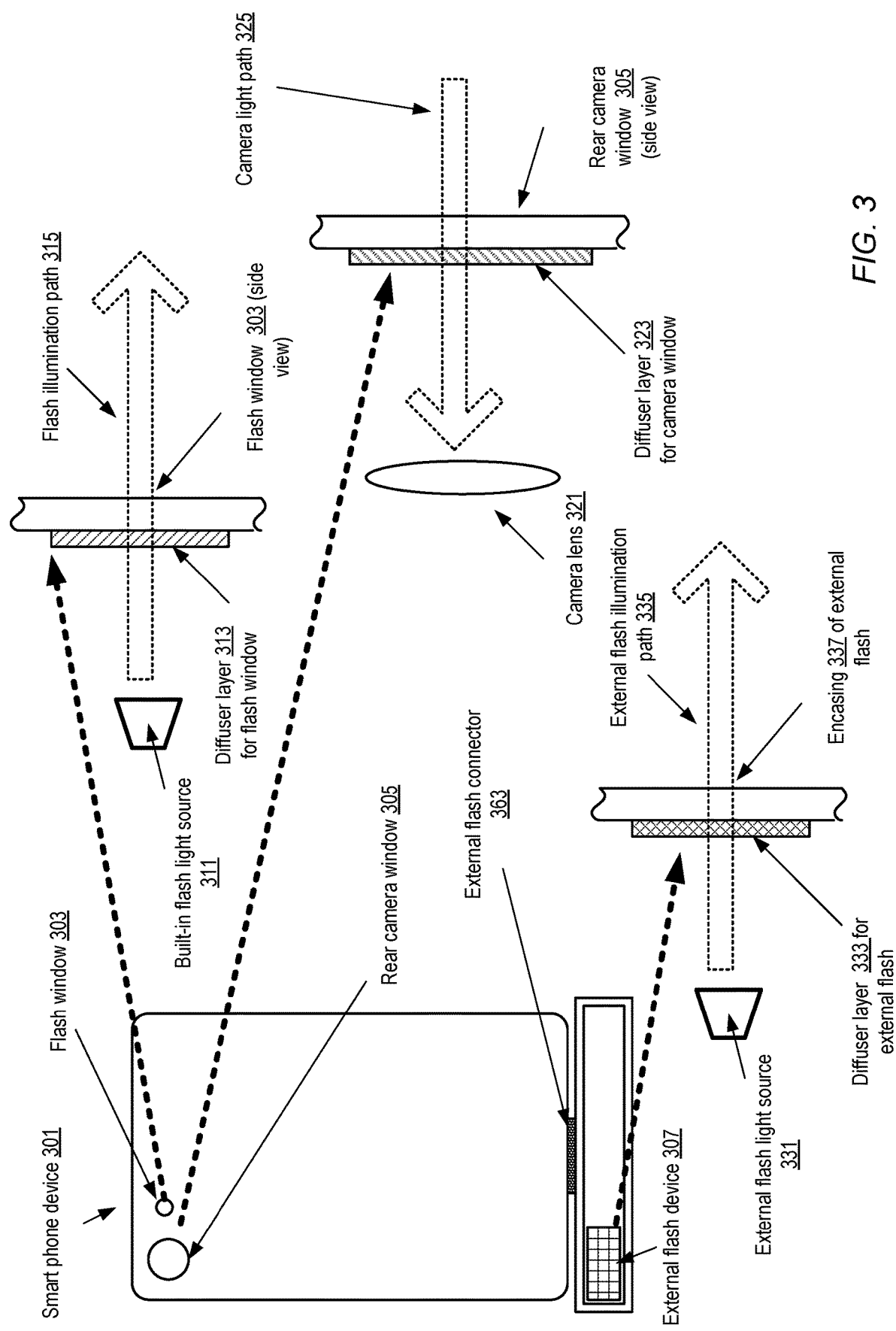
FIG. 3 illustrates examples of diffusers implemented for flash devices configured to illuminate scenes for a digital camera of an electronic device, according to at least some embodiments.

FIG. 3 illustrates examples of diffusers implemented for flash devices configured to illuminate scenes for a digital camera of an electronic device, according to at least some embodiments. The rear face of a smart phone electronic device 301 is shown. The rear face includes a rear camera window 305 behind which a digital camera lens is located, and a flash window 303 behind which a built-in or embedded flash unit is located in the depicted embodiment. In addition, an external flash device 307 is shown attached to the smart phone 301 via external flash connector 363. One or both of the flashes (the built-in flash and the external flash) may be used for illuminating any given scene to be captured using a still or video image.

In the depicted embodiment, a respective diffuser is implemented for the camera and for each of the flash devices—the built in flash as well as the external flash. As shown, a diffuser layer 313 is positioned along the outward flash illumination path 315, between the built-in flash light source 311 (e.g., an LED or a Xenon tube or lamp) and the flash window 303. Similarly, a diffuser layer 333 is positioned along the external flash illumination path 335 from the external flash light source 331. The diffuser layer 333 is shown attached to the encasing 337 of the external flash device in the depicted embodiment. Finally, diffuser layer 323 is shown attached to camera window 305, along the incoming camera light path 325 between the exterior of the phone and the camera lens 321. The flash diffusers 313 and/or 333 may be used to support any of various flash mode options in the depicted embodiment, such as center-focused flash, fill-in flash, widely-dispersed flash, and so on. The selection of the flash mode may be made by image analysis algorithms executed by one or more processors of phone 301, e.g., based on input received from the ALS-enabled digital camera that uses diffuser 323, from face detection algorithms, motion-detector algorithms, proximity sensors and the like. Any combination of the three diffuser example types 313, 323, and 323 shown in FIG. 3 may be implemented in a given embodiment. A camera window such as 305 with a diffuser may be referred to as a "diffuser-equipped" camera window herein, and a flash window such as 303 with a diffuser may be referred to as a "diffuser-equipped" flash window. In addition, a camera with a diffuser-equipped camera window may be referred to as a diffuser-equipped camera, and a flash with a diffuser-equipped flash window may be referred to as a diffuser-equipped flash. The diffuser materials, optical properties, signal sensitivities, control circuitry, and/or software may differ for the respective diffusers of the built-in flash, the external flash, and the camera, in various embodiments.

Figure 4:
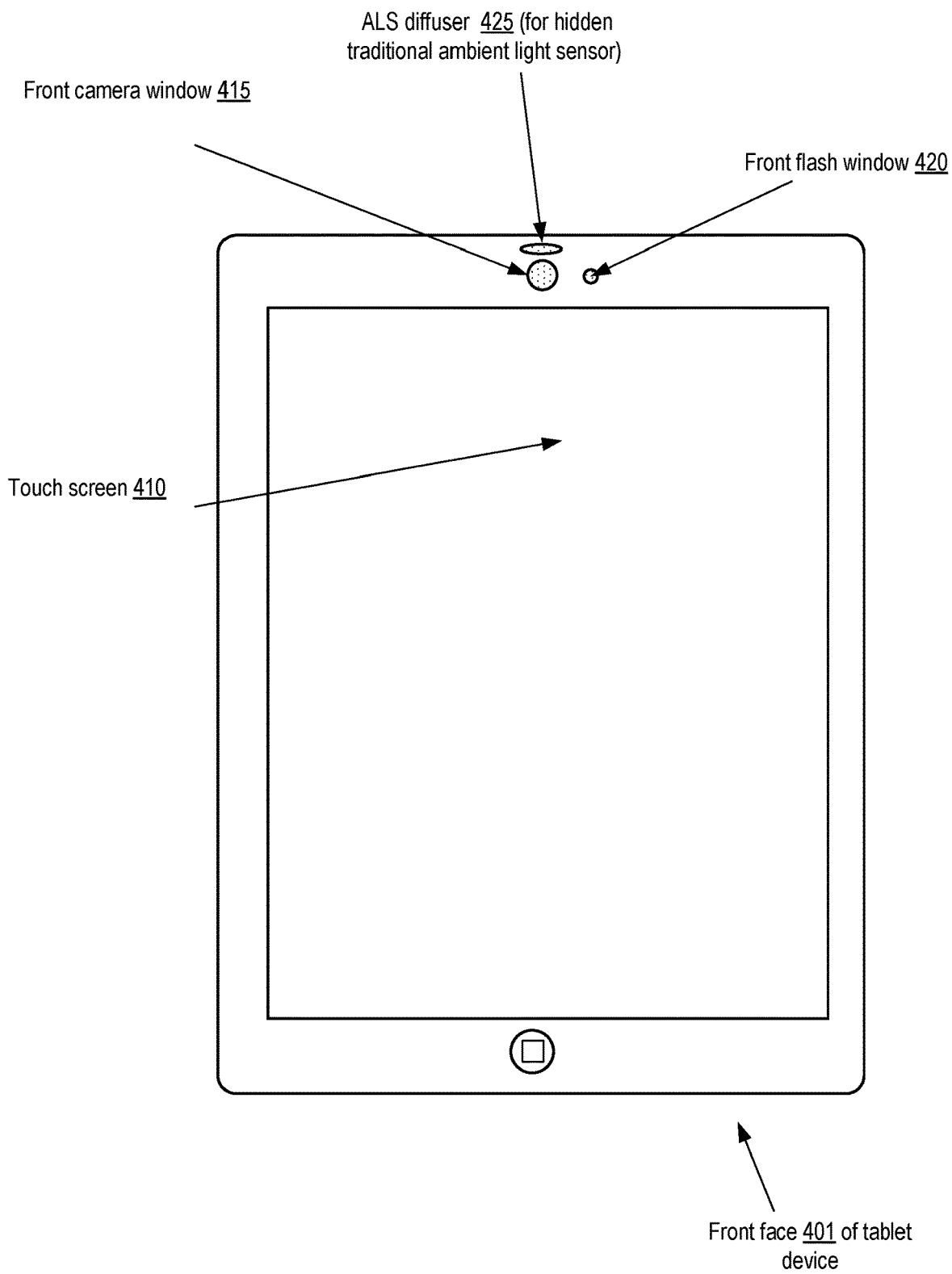
FIG. 4 illustrates an example of a placement of a diffuser implemented for a traditional ambient light sensor (i.e., an ambient light sensor that does not employ a digital camera) of an electronic device, according to at least some embodiments.

FIG. 4 illustrates an example of a placement of a diffuser implemented for a non-camera ambient light sensor (i.e., an ambient light sensor that does not employ a digital camera) of an electronic device, according to at least some embodiments. The front face 401 of a tablet computing device is shown. The front face includes a touch screen 410, a front camera window 415 and a front flash window 420. In addition, in the depicted embodiment, a diffuser 425 for a conventional non-camera ambient light sensor, such as a sensor implemented using one or more photodiodes, is shown in the depicted example. The traditional ALS and/or its diffuser 425 may be hidden, e.g., positioned behind one or more small transparent or unpainted sections of the otherwise opaque bezel or encasing of the tablet in some embodiments. The diffuser 425 may be used in the depicted embodiment for adaptive light sensing by the non-camera ALS, e.g., the angular acceptance of the conventional sensor may be modified by changing the electrical signals sent to the diffuser 425 as described earlier. In some embodiments, one or both of the front camera window 415 and/or the front flash window 420 may also be equipped with respective diffusers, e.g., to support camera-enabled ALS, enhanced flash features and the like.

Diffuser Materials

A number of different materials with switchable or variable optical properties such as diffusivity and/or transparency may be used for the diffuser layers in various embodiments. In some embodiments, one or more types of "smart glass" may be used. The term "smart glass" may in general refer to electrically switchable glass or similar material whose optical properties may be changed when an electrical signal such as a changed voltage is applied. Some types of smart glass may also be referred to as "EGlass" or "switchable glass". Depending on the type of smart glass used, when activated by a voltage change or by some other electrical signal, the glass may change from transparent to translucent, diffusing or scattering some of the incident light. Alternatively, some types of smart glass may become completely opaque when a signal is applied, and other types may support a continuum of opacity and/or diffusivity. The extent to which a particular optical property of the smart glass is affected by the signal may depend on the strength of the signal in some embodiments—e.g., a larger voltage may result in less diffusion and more transparency or transmittance than a smaller voltage. In some implementations, more complex signals such as bursts or waves of different voltage levels may be used.

In at least some embodiments, polymer dispersed liquid crystal (PDLC) devices may be used to implement the smart glass layer. In PDLCs, liquid crystals may be dissolved or dispersed into a liquid polymer, followed by solidification or curing of the polymer. During the change of the polymer from a liquid to a solid, the liquid crystals may become incompatible with the solid polymer and form small drops or droplets. The curing conditions may affect the size of the droplets, which may in turn affect the final operating properties of the smart glass. A layer of transparent conductive material may be placed on each side of the solidified polymer in some embodiments to serve as electrodes for applying voltage differences to the polymer. A "sandwich" structure may thus be formed by the transparent electrodes and the polymer between the electrodes. In other embodiments, as described below, other electrode placements may be used.

Electrodes from a power supply and/or control circuitry may be attached to the transparent electrodes in various embodiments. With one level of applied voltage (which may be zero in some implementations), the liquid crystals may remain arranged randomly in the droplets, resulting in scattering of light as it passes through the smart glass sandwich. This may result in a translucent, "milky white" or "frosted" appearance. If the PDLC is positioned between a digital camera lens and a scene for which a still or video image is to be generated, the contrast detected by the camera between various portions of the scene may be reduced, and/or portions of the scene may be distorted. When a different voltage is applied to the electrodes, the electric field formed between the two transparent electrodes on the glass may cause the liquid crystals to align, allowing light to pass through the droplets with very little scattering and resulting in a transparent state. The degree of transparency may be controlled by the applied voltage or current in some implementations. For example, at lower voltages only a few of the liquid crystals may align completely in the electric field, so only a small portion of the light passes through while most of the light is scattered. As the voltage is increased, fewer liquid crystals may remain out of alignment, resulting in less light being scattered. It may also be possible to use tinted or colored layers of PDLCs in some implementations, and to control the colors by signaling in a manner analogous to controlling the level of light scattering. In some implementations, near-complete opacity and/or near-complete transparency may be achieved using PDLCs, while in other implementations a more limited range of transparency may be achieved. Greater opacity may be achieved in some embodiments using multiple layers or films of PDLC stacked on each other, with each of the stacked layers contributing a respective reduction in transparency.

Figure 5A:
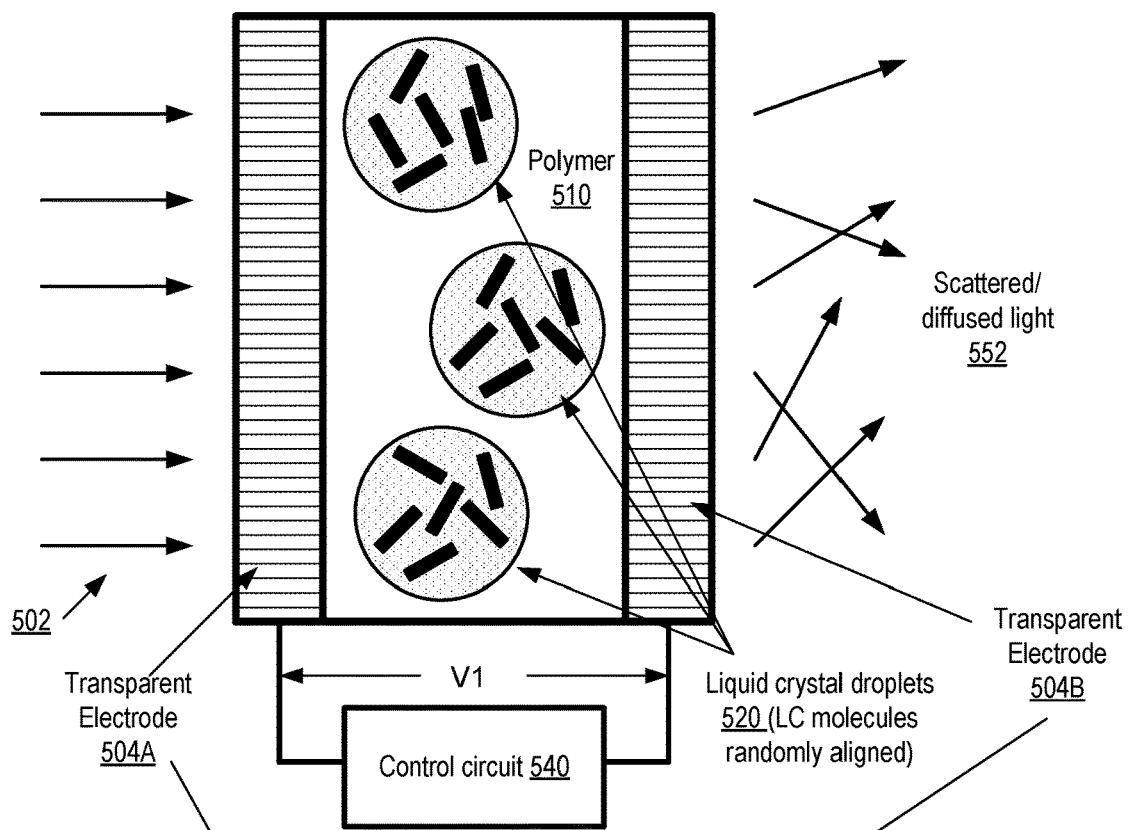
FIG. 5A and FIG. 5B are block diagrams illustrating the use of polymer dispersed liquid crystals (PDLCs) as a diffuser layer, according to at least one embodiment.
Figure 5B:
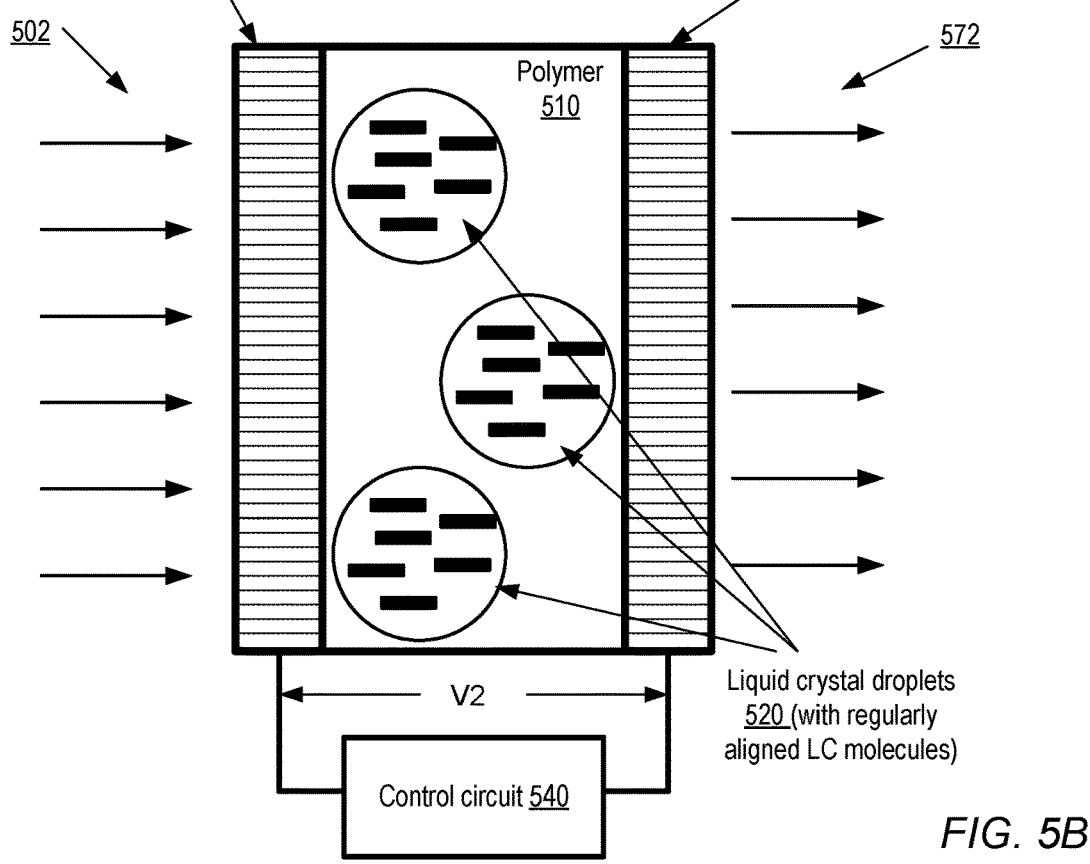

FIG. 5A and FIG. 5B are block diagrams illustrating the use of polymer dispersed liquid crystals (PDLCs) as a diffuser layer, according to at least one embodiment. As shown, a polymer layer 510 may include a plurality of liquid crystal droplets 520. A control circuit 540 may apply a voltage across transparent electrodes 504A and 504B between which the polymer layer 510 is positioned. In some embodiments, at least a portion of the electrodes 504 may be constructed of ITO (Indium Tin Oxide); in other embodiments, different materials may be used. At some input voltage levels such as V1 (FIG. 5A), the liquid crystal molecules in the droplets 520 may be randomly aligned. As a result, the incident light 502 may be scattered or diffused, as indicated by the arrows labeled 552 in FIG. 5A. When a different voltage is applied, such as V2 in FIG. 5B, the liquid crystals of the molecules may become aligned in a direction such that the incident light 502 passes through without scattering or diffusion, as indicated by the arrows labeled 572. The extent of scattering/diffusion may depend on the voltage applied in at least some embodiments. The scattering of the incident light may result in changes to the appearance of the PDLC layer (and hence of any transparent material adjacent to the PDLC layer, such as the glass or plastic encasing of the camera and flash windows shown in FIG. 1, FIG. 2 and FIG. 3); for example, in the state shown in FIG. 5A, the PDLC layer may appear frosted or more opaque than it does in the state shown in FIG. 5B.

In some embodiments, different placements of PDLC electrodes with respect to the polymer layer may be used than illustrated in FIG. 5. For example, in the depicted example, the electrodes 504A and 504B are placed in parallel planes with respect to the polymer layer 510. For at least some implementations, the state of the PDLC layer may be considered "OFF" with voltage V1 set to zero, and "ON" when some non-zero voltage V2 is applied. During the "ON" state with the electrodes 504A and 504B positioned as shown in FIG. 5, the PDLC is more clear or transparent than in the OFF state. With a different electrode configuration (e.g., at an angle rather than parallel to the polymer layer, or perpendicular to the polymer layer), the "ON" state with non-zero voltage applied may correspond to a dark or diffuse appearance, while the "OFF" state with zero voltage applied may correspond to a clear or transparent appearance. Various combinations of different electrode materials (e.g., ITO and/or other materials), different positions of electrodes with respect to the polymer, and different voltages or control signals, may result in different mappings of ON and OFF states to the optical properties of the polymer in different embodiments. Furthermore, in at least some embodiments, polarizing filters or polarizing films may be positioned on one or both sides of the PDLC's polymer layer. In one implementation, for example, two polarizing filters with different axes of transmission may be used on either side of a PDLCs, such that the extent to which light passes through the second filter differs from the extent to which the light passes through the first. If the two axes were made perpendicular to each other, for example, light passing through the first filter may be blocked by the second filter. Combining polarizers with PDLCs may further extend the range through which optical properties of smart glass may be varied in some embodiments.

A technology referred to as "micro-blinds" may be utilized in some embodiments for implementing smart glass, instead of or in addition to using PDLCs. Micro-blinds may comprise small and thin rolled or curved metal blinds deposited on a glass substrate. The metal may be deposited, for example, by magnetron sputtering and may be patterned by laser or lithography processes. The glass substrate may include a thin layer of a transparent conductive oxide (TCO) material. A thin insulator may be deposited between the rolled metal layer and the TCO layer for electrical disconnection. With no applied voltage, the micro-blinds may remain rolled and let light pass through. When there is a potential difference between the rolled metal layer and the transparent conductive layer, the electric field formed between the two electrodes may cause the rolled micro-blinds to stretch out (i.e., become flat instead of curved) and thus block light.

Other types of smart glass layers or films may be deployed in other embodiments. For example, photochromic thin films, such as nano-crystalline thin films, that change opacity or color in response to electrical signals may be used in some embodiments. Suspended particle devices (SPDs) may be deployed in other embodiments. In an SPD, a thin-film laminate of rod-like particles may be suspended in a fluid placed between two glass or plastic layers. When no voltage is applied, the suspended particles may remain arranged in random orientations and tend to absorb light, so that the glass panel looks dark or opaque. When voltage is applied, the suspended particles may align and let light pass. SPDs may be programmatically tuned to control the amount of light passing through.

In some embodiments, small liquid crystal display (LCD) segments may be used instead of smart glass. Such segments may be arranged in a two-dimensional array in one implementation on the encasing of an electronic device. By changing the color and/or the brightness of the small LCD segments programmatically, it may be possible to display application state information, and/or to distort or scatter incident light to the extent desired for the types of ambient light sensitivity determinations described above.

A number of different techniques may be employed to obtain desired levels of diffusivity or opacity, even if individual layers of the materials used do not provide the full range of diffusivity/opacity desired. For example, as noted above, in one embodiment, multiple layers of PDLC films may be used, such that the combination of the layers is capable of providing greater opacity than any single layer. Combinations of different materials, with respective optical properties, may be used in some embodiments—for example, one material that is easy to switch between almost fully transparent and almost fully opaque may be used together with another material that supports more continuous variations in transmittance or diffusivity. In another embodiment, numerous sections of small, independently controllable portions of variable-diffusivity materials may be arranged on a given transparent section of a camera window or a flash window, e.g., in an array, such that by controlling the signals transmitted to the different sections, a desired visual effect (such as a display of text) may be achieved.

During development, functions relating various combinations of electrical signals to the desired optical properties and visual effects may be encoded into the software used for managing the diffusers. For example, a standard light source configured to issue a beam of light may be used, and the ratio of the amount of light received through the diffuser, to the original amount of light emitted by the source, may be measured as a function of various parameters for a given material, such as the voltage applied, the angle of incidence of the beam, the thickness or shape of the diffuser layer, the width of the beam, and so forth.

Diffuser Placement

Figure 6A:
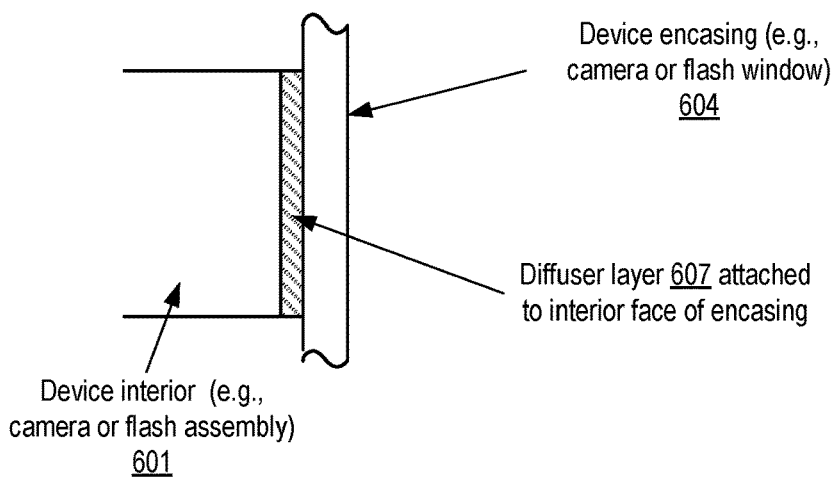
FIG. 6A-6H are block diagrams illustrating alternatives for positioning diffuser layers for an electronic device, according to at least some embodiments.

FIG. 6A-6H are block diagrams illustrating alternatives for positioning diffuser layers for an electronic device, according to various embodiments. In several of the illustrated embodiments, alternatives for placing one or more layers of a diffuser relative to a transparent encasing (such as a camera window or a flash windows similar to those illustrated in FIG. 1, FIG. 2 or FIG. 3) of an electronic device are shown. In FIG. 6A, for example, a diffuser layer 607 is attached to the interior face of the encasing 604, such that light from the exterior of the device first passes through the encasing and then passes through the diffuser on its way to the interior 601 of the device. In the case of a flash diffuser, the light from the flash light source passes through the diffuser first, before passing through the encasing 604 of the flash. Any desired method of attaching the diffuser layer 607 may employed in different implementations, such as an adhesive, or one or more mechanical fasteners.

Figure 6B:
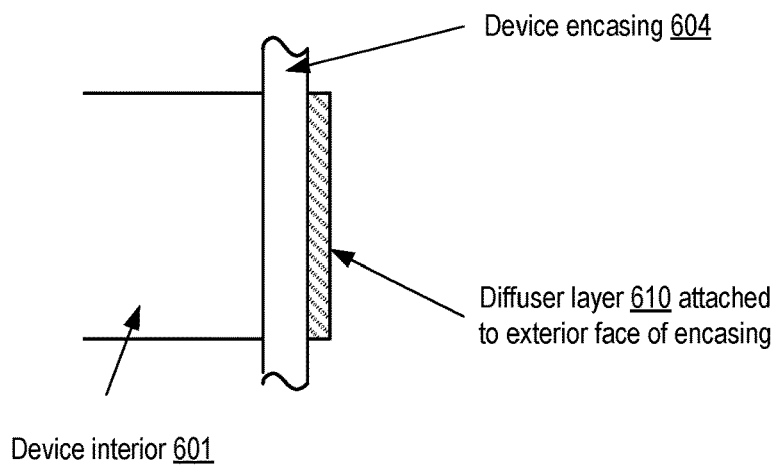
Figure 6C:
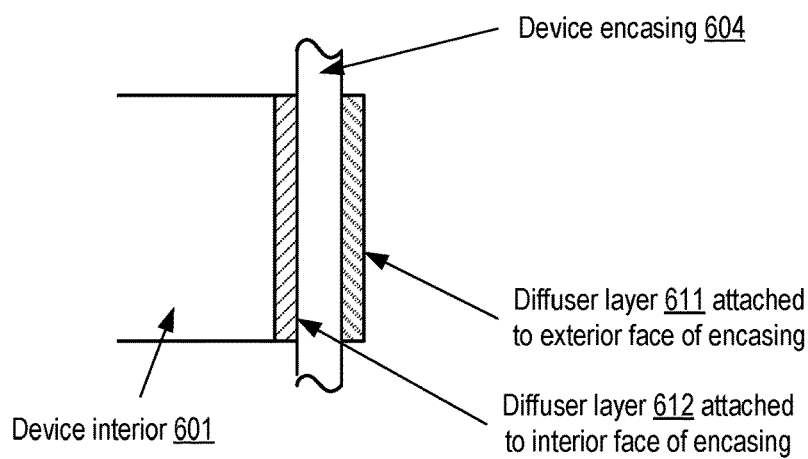
Figure 6D:
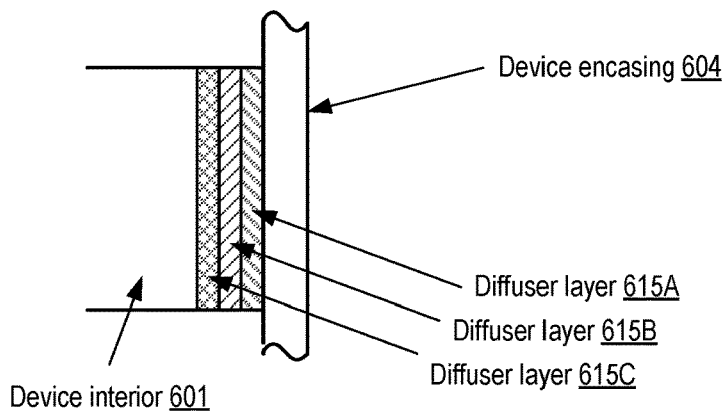
Figure 6E:
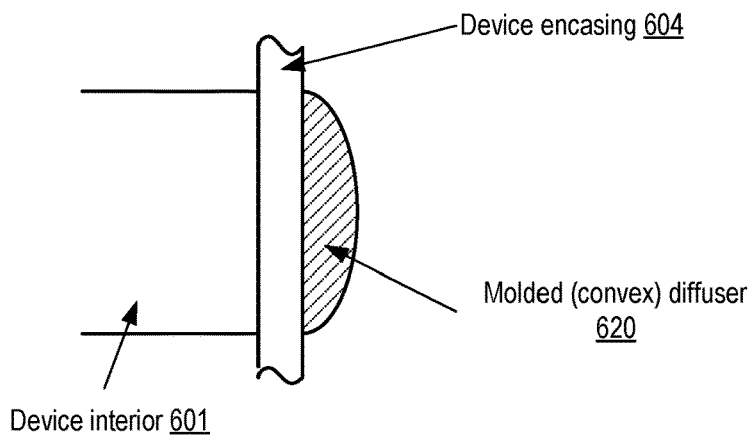
Figure 6F:
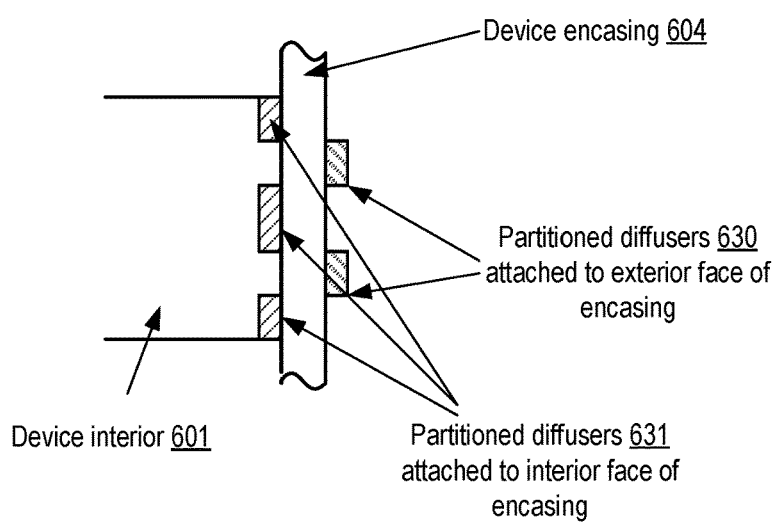

In the embodiment depicted in FIG. 6B, the diffuser layer 610 is attached to the exterior of the encasing 604, such that incoming light first passes through the diffuser 610 before reaching the device interior 601. Such placement of the diffuser on the exterior of the encasing may provide several advantages in different implementations, such as less contention for potentially crowded space in the interior of the device, easier manufacturing processes, and/or the ability to support wider angles of view than in the diffuser were located on the interior face of the encasing as in FIG. 6A. Interior and exterior diffusers may be combined in some embodiments, such as the embodiment shown in FIG. 6C, in which the electronic device is equipped with diffuser 612 attached to the interior of the encasing and diffuser 611 attached to the exterior of the encasing. In some implementations, having multiple layers of variable diffusivity materials as in FIG. 6C, where some layers have different properties than others, may be useful to achieve wider ranges of optical effects than would be possible with a single layer. As shown in FIG. 6D, in some embodiments multiple layers of different diffusive materials may be positioned on the same side of the device encasing 604. In the example illustrated in FIG. 6D, three "stacked" diffuser layers 616A, 615B and 615C are shown on the interior of the encasing, with layer 615A attached to the encasing, layer 615B attached to layer 615A, and layer 615C attached to layer 615B. Similar combinations of multiple diffuser layers may be utilized on the exterior of the encasing 604 in some embodiments, and/or on both sides of the encasing in other embodiments. As described above, such stacking of diffuser layers may help support greater opacity or other desired optical properties that would be more difficult to achieve with a single layer.

In at least some embodiments, a diffuser may be shaped or molded into forms other than the sheets or films (i.e., layers with constant cross sectional widths) shown in FIG. 6A through FIG. 6D. For example, in the embodiment depicted in FIG. 6E, a diffuser has been molded into a convex form with a flat surface attached to the exterior of device encasing 604. In various embodiments, diffusers may be shaped as desired and combined with other diffusers on either the interior or exterior of the encasing. The various shapes may be implemented for a variety of different reasons, including more variations in optical properties than may be possible with sheets, aesthetic or design reasons (e.g., the look and/or feel of a molded exterior diffuser may be considered a design advantage in some scenarios).

A diffuser may comprise several different partitions or segments distributed over the exterior and/or interior face of the encasing 604 in some embodiments. For example, in FIG. 6F, partitioned diffusers 631 are attached on the interior face of the encasing 604, while partitioned diffusers 630 are attached on the exterior face. Such combinations of potentially independently controllable diffusers may enable fairly sophisticated control of either the overall optical properties of the combinations, the exterior appearance or visual effect of the encasing, or both the overall optical properties and the visual effect, in various embodiments.

Figure 6G:
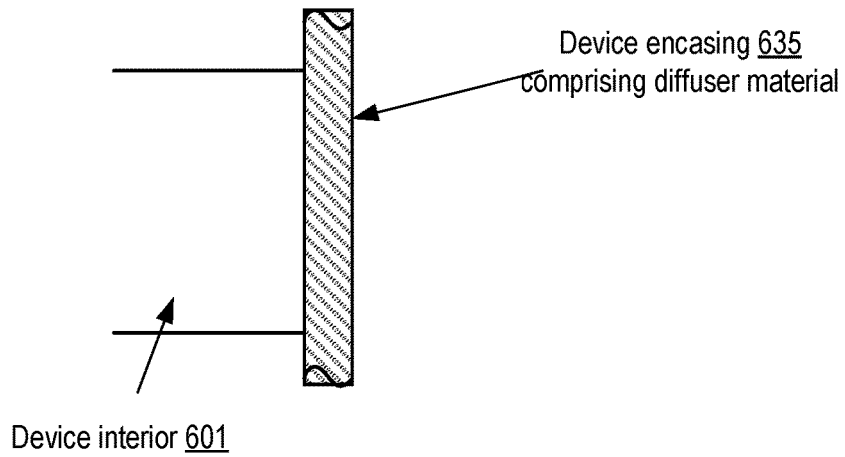
Figure 6H:
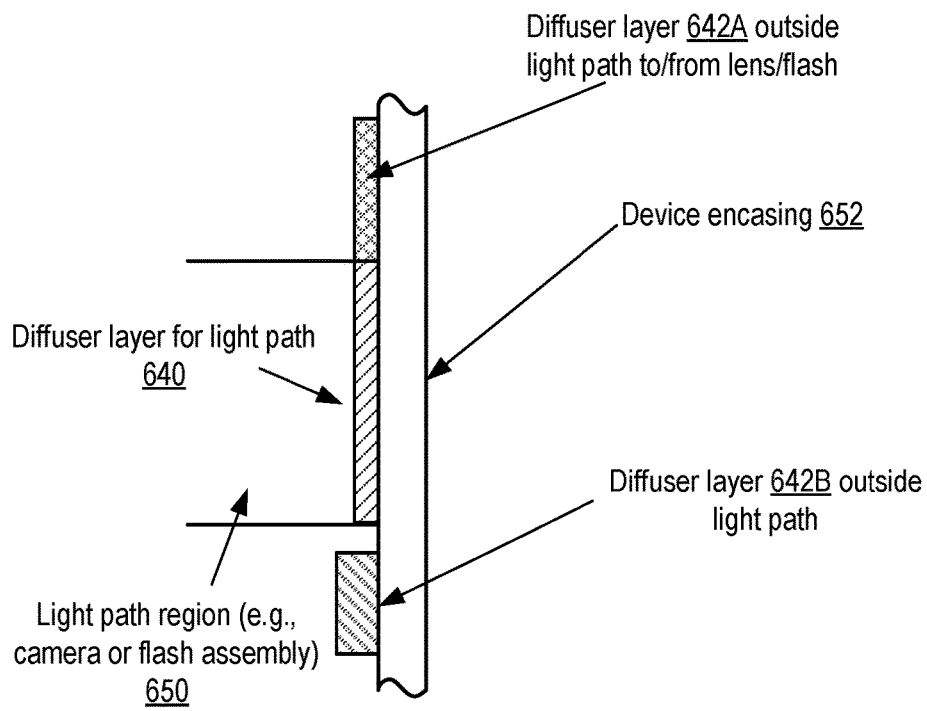

In at least one embodiment, instead of being attached to one or both faces of the encasing of an electronic device, diffuser layers may be part of the encasing. That is, as shown in FIG. 6G, in some embodiments, at least a portion of the encasing 635 may itself comprise variable or switchable diffusivity material. Such a design may also have aesthetic appeal to certain customers, in that for example some of the internal components of the electronic device may be made partially visible through the encasing, at least under certain conditions.

In some embodiments, different types of diffusers may be attached to different parts of the same side of the encasing. For example, in FIG. 6H, a first diffuser layer 640 is shown attached to the portion of the interior of the encasing 652 that covers the light path for a camera or flash. Other diffuser layers such as 642A and 642B may be positioned on other parts of the encasing interior face, e.g., for displays of application state, or for aesthetic reasons. Some diffuser layers may be thicker than others; for example, layer 642B is thicker than 642A in FIG. 6H It is noted that the various approaches shown regarding the placement of diffuser regions in FIG. 6A-6H may be combined in various ways, as desired, in different embodiments. For example, multiple diffuser layers may be employed on the exterior surface of the encasing in some embodiments, either in a stacked configuration similar to that of FIG. 6D or in a configuration similar to that shown in FIG. 6H in some embodiments, and molded diffusers similar to that shown in FIG. 6E may be implemented on the interior face of the encasing in other embodiments.

Example Change in Diffusivity with Applied Signal

Figure 7:
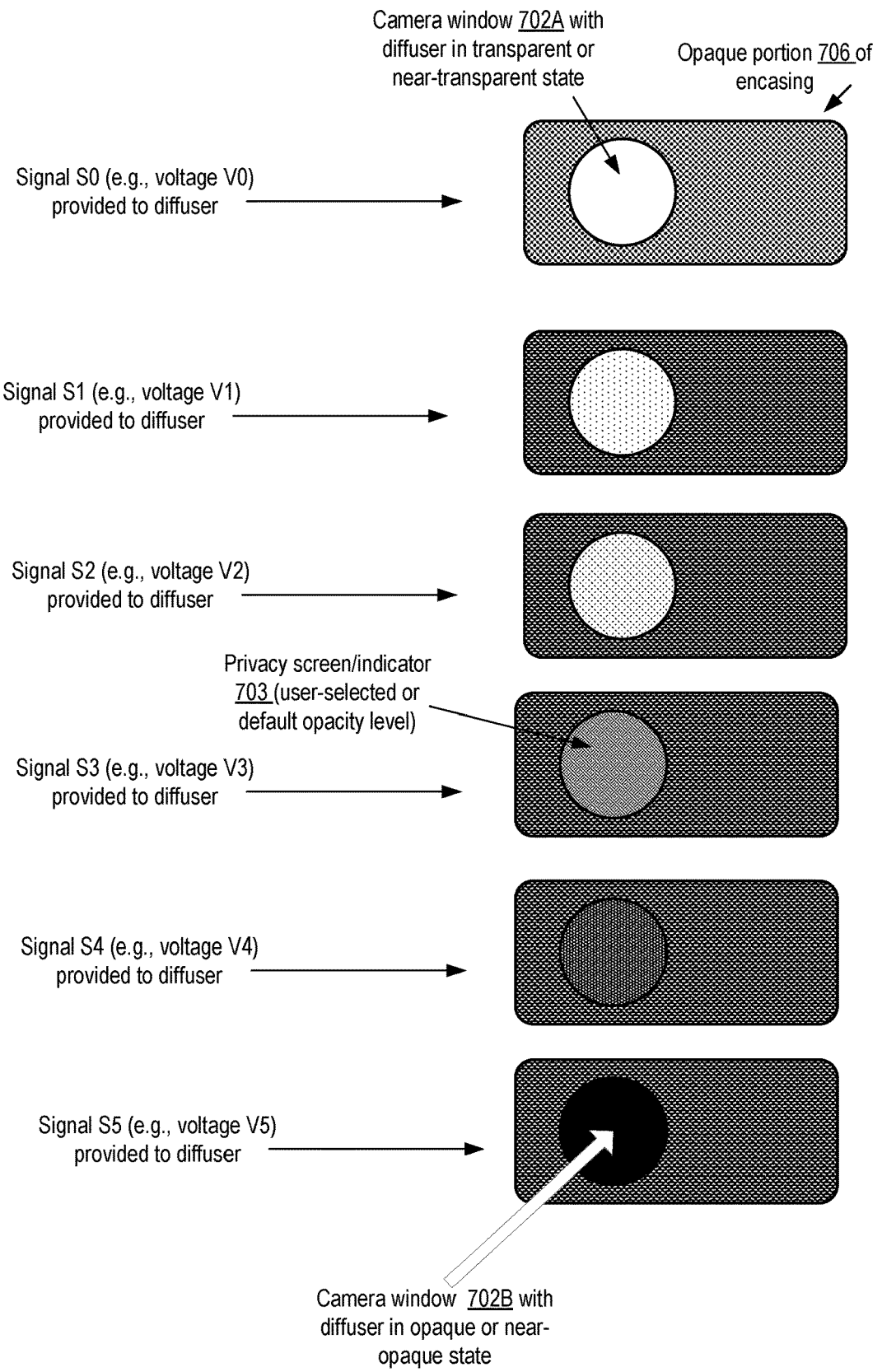
FIG. 7 illustrates examples of variations in the external appearance of a camera window of an electronic device as the voltage applied to the electrodes of a diffuser is changed, according to at least one embodiment.

FIG. 7 illustrates examples of variation in the external appearance of a camera window of an electronic device as the signal sent to a diffuser is changed, according to at least one embodiment. The exterior view of a diffuser-equipped camera window of an electronic device, similar to the camera windows shown in FIG. 1-FIG. 3, as well as a portion of an opaque encasing surrounding the camera window, are shown for the depicted embodiment. The appearance of the camera window changes from transparent (or near-transparent) to opaque (or near opaque) as the diffusivity changes with the applied signals initiated by instructions executed on the processor(s) of the electronic device.

When a signal S0 (e.g., a voltage V0 across the electrodes of the diffuser) is provided, the window 702A may appear nearly or fully transparent. When a signal S5 (e.g., a voltage V5 across the electrodes) is applied, the window 702B may appear nearly or fully opaque. When other signals S1 through S4 (e.g., respective voltages V1 through V4 between V0 and V5) are applied in order, the appearance of the window may become progressively more opaque. In at least one embodiment, one or more of the diffusivity settings corresponding to signals S1 through S5 may be used as a privacy screen or privacy indicator 703 for users of the electronic device. To use the diffuser as a privacy screen, one or more optical properties of the diffuser may be set such that it becomes impossible for the camera sensor to generate an undistorted image; for example, the image obtainable may be so blurred or diffused that it is not possible to distinguish any faces or identify details of any objects. When the camera window appears to be cloudy, frosted or otherwise non-transparent, this may also indicate to a user (and/or to other bystanders) that the camera is not generating images or video, and that the privacy of the user or bystander is not being violated by the camera. In at least some embodiments, the user may be allowed to select the particular appearance (e.g., level of opacity or cloudiness) of the camera window desired as a privacy screen or indicator, e.g., by making changes to the general settings or camera configuration of the electronic device to change a default opacity setting for the privacy indicator. Colors rather than different opacity levels may be used for privacy indicators in some embodiments.

Diffusers for Information Display

Figure 8A:
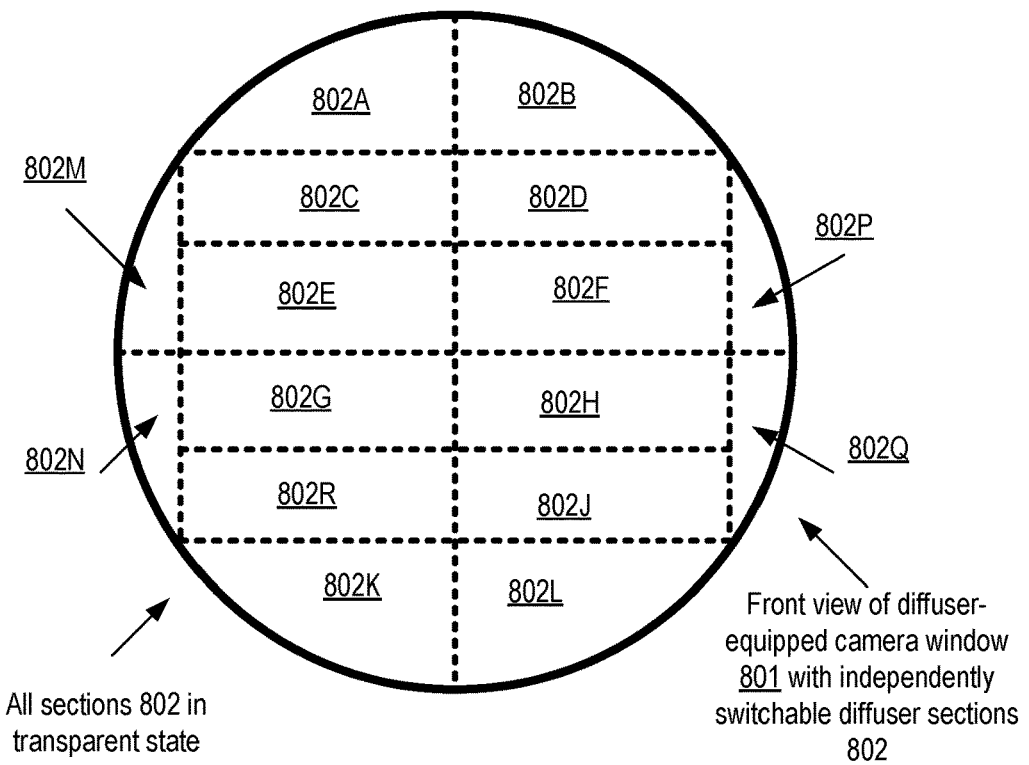
FIGS. 8A and 8B illustrate example front views of a camera window with a plurality of independently switchable diffuser sections, according to at least one embodiment.
Figure 8B:
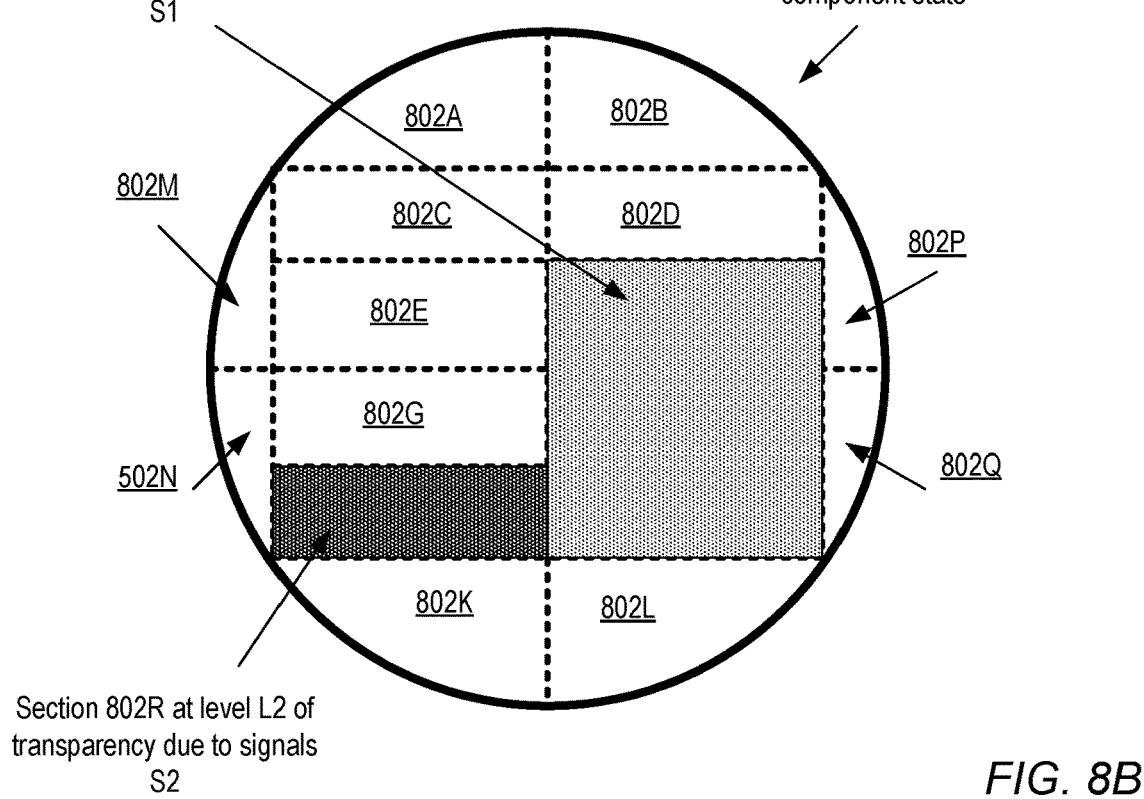

FIGS. 8A and 8B illustrate front views of a camera window with a plurality of independently switchable diffuser sections 802, according to at least one embodiment. As shown in FIG. 8A, a diffuser attached to the camera window is divided into several sections 802A, 802B, 802C, 802D, 802E, 802F, 802G, 802H, 802J, 802K, 802L, 802M, 802N, 802P, 802Q and 802R. An electrical signal may be sent to any given section 802 in the depicted embodiment without affecting the signals sent to others sections, and thereby the optical properties of the different sections may be varied independently. All sections 802 are shown in a transparent state in FIG. 8A.

As shown in FIG. 8B, some of the sections 802 may be made more opaque than others. In the scenario depicted, the transparency level of sections 820F, 802H and 802J has been changed to a level L1 by transmitting signals S1 to those sections, while the transparency of section 802R has been set to a different level L2 by sending a different signal S2 to section 802R. Accordingly, to a user of the electronic device, the camera window as depicted in FIG. 8B may appear to comprise two rectangles of different heights and different transparency levels—one rectangle formed from sections 802F/802H/802J, and another rectangle formed by section 802R. In some embodiments such an appearance of the camera window may serve as an indicator 821 of the state of one or more applications. For example, the rectangle formed by element 802R may indicate a number of tasks due within the next day (based on a calendar application or task scheduling application installed on the electronic device), and the rectangle formed by 802F/802H/802J may indicate the state of the battery of the electronic device. Different optical properties may be used for application or component state indicators in various embodiments—e.g., different colors rather than different levels of transparency may be used. Users may be allowed to select the applications or subcomponents whose state is to be displayed using diffuser sections (or combinations of sections), and/or the mappings between different application states and the appearance of the camera window in some embodiments. For example, in one implementation a user may change the settings of the camera window such that the height of a darkened rectangle is proportional to the number of outstanding e-mails that have been received but not yet read from a particular group of e-mail contacts.

Supplemental Light Sources for Information Display Through Diffuser

FIG. 9A-9D are block diagrams illustrating a use of a supplemental light source for information display through a diffuser layer of an electronic device, according to at least one embodiment. A supplemental light source such as one or more LEDs may be positioned near the diffuser-equipped camera window or flash window of an electronic device in some embodiments. The supplemental light source may not be directly visible from the exterior of the device, but light from the source may be visible through the camera window or flash window, depending on the settings of the optical property of the diffuser, and of course on the state of the light source itself (i.e., whether the source is emitting light or not). The supplemental light source may be used in conjunction with the diffuser to display various types of information, such as application or subcomponent state, to users of the electronic device in some embodiments.

Figure 9A:
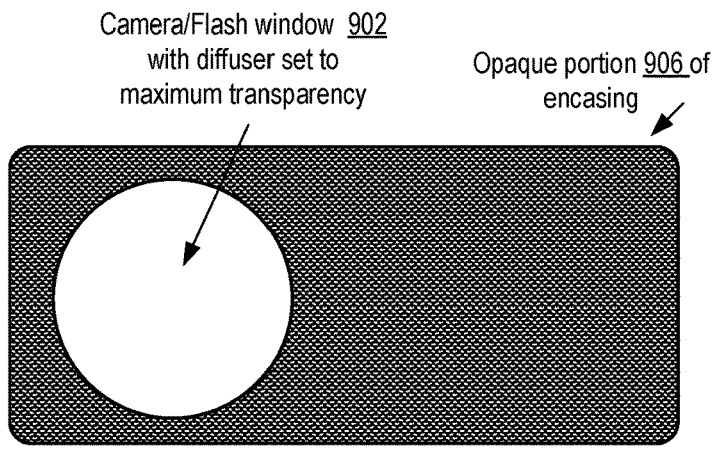
FIG. 9A-9D are block diagrams illustrating a use of a supplemental light source for information display through a diffuser layer of an electronic device, according to at least one embodiment.
Figure 9B:
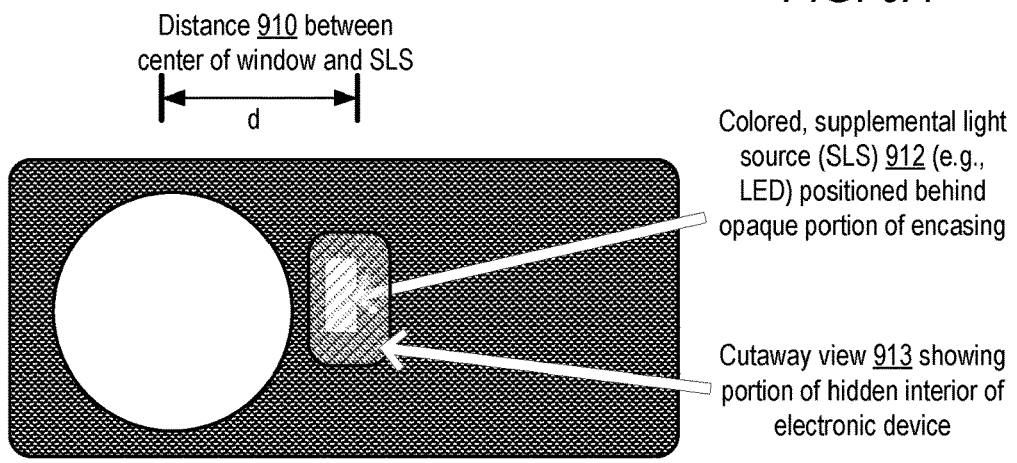
Figure 9C:
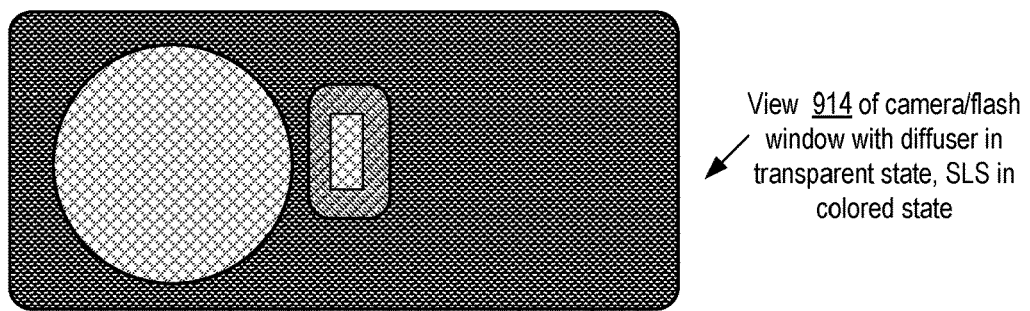
Figure 9D:
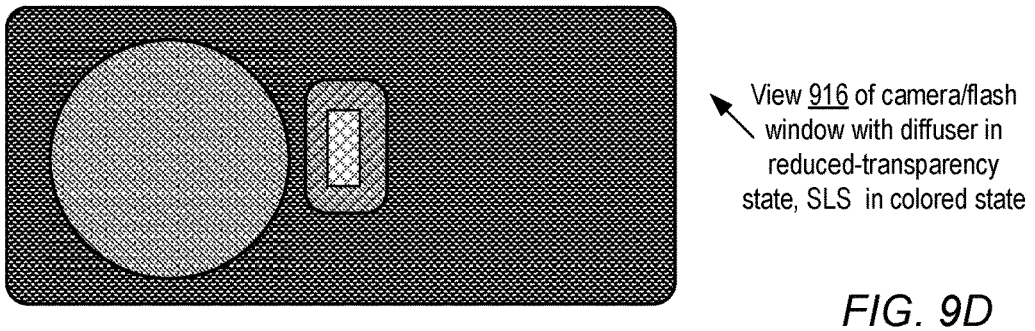

FIG. 9A illustrates a first view of an electronic device, with the diffuser associated with window 902 set at maximum transparency. An opaque portion of the encasing of the electronic device that surrounds the camera or flash window 902 is also shown. FIG. 9B provides a cutaway view 913 revealing the position of a supplemental light source (SLS) 912, hidden behind the opaque portion of the encasing. (The cutaway view 913 shown in FIG. 9B-9D is not intended to indicate that the encasing is actually removed in the depicted embodiments; the SLS remains hidden to viewers of the electronic device.) As shown, the SLS 912 is located at a distance "d" (labeled distance 910) from the center of the window 902. Depending on the shape and implementation of the diffuser and the extent to which the diffuser overlaps with the window 902, the SLS may also be located at a distance "d" from the center of the diffuser layer in the depicted embodiment. The distance "d" and/or the orientation of the SLS with respect to the diffuser may affect the extent to which the light provided by the SLS is visible through the diffuser. In some implementations, and depending on the properties of the SLS used, a given SLS may have to be placed within a threshold distance of the diffuser in order for it to be used effectively with the diffuser.

FIG. 9C illustrates the view 914 of the electronic device with the SLS 912 illuminated and the diffuser set at maximum transparency. Light from the SLS is visible through the diffuser, and the window 902 appears to assume the color of the light provided by the SLS. If the diffuser is darkened (e.g., by increasing its diffusivity via one or more electrical signals), the apparent color of the window 902 may also become darker, as shown in FIG. 9D. The range of apparent colors of the window 902 achieved by illuminating the SLS 912 and varying the opacity or diffusivity of the diffuser may be used to convey various types of information—e.g., a bright red color may be employed to indicate one state of an application (such as more than 50 e-mail messages that have not yet been read), while a dark red color may be employed to indicate that more than 10 but less than 50 e-mail messages are unread.

In at least some embodiments, multiple supplemental light sources may be deployed, e.g., with different colors, and/or at different distances than others from the window. The SLSs may be positioned on any side of the window 902—e.g., some may be to the left, others to the right, above or below the window as seen face-on. Separate SLSs may be used for flash windows than for camera windows in some embodiments, while in other embodiments a single SLS may be used for both a camera window and a nearby flash window.

Diffusers Positioned Away from Light Paths of Cameras or Flashes

Figure 10:
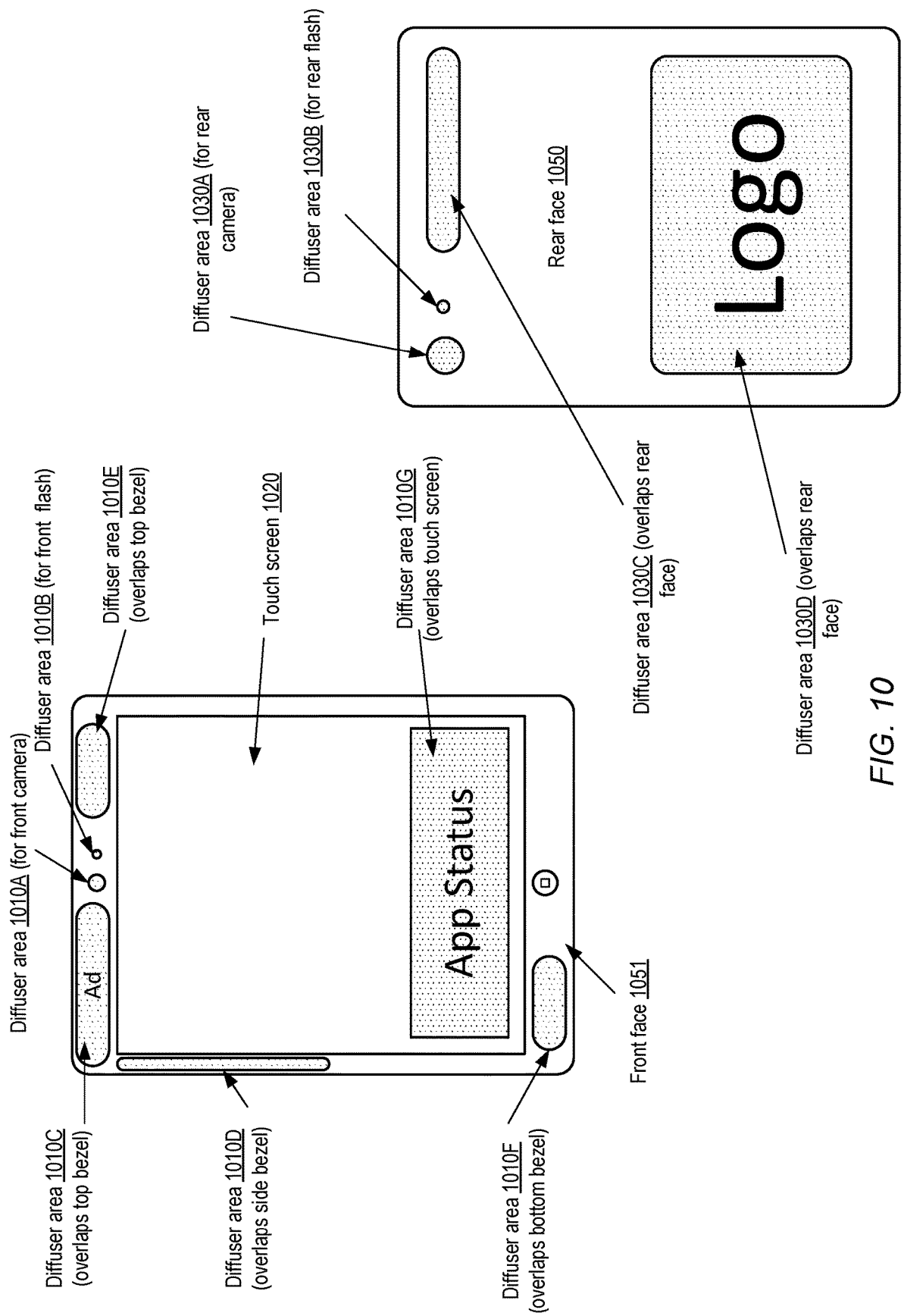
FIG. 10 illustrates several diffusers distributed on the front and back faces of a tablet computer device, according to at least some embodiments.

In at least some embodiments, diffusers may be located at areas other than camera windows or flash windows, e.g., on various areas of the front face and/or back face of an electronic device or display, away from the incoming light path of the camera and the outgoing light path of the flash. FIG. 10 illustrates several diffusers distributed on the front and back faces of a tablet computer device, according to at least some embodiments. Touch screen 1020 may be considered the primary user interface and primary display of the tablet computer device, while one or more diffusers attached to the tablet may be considered secondary displays. During a given time period, the primary user interface and the diffuser-based displays may show information from different sources and/or for different purposes. In at least one embodiment, a user may be able to submit diffuser display configuration requests (e.g., via a "settings" menu available using the primary user interface), indicating the data sources for the information to be displayed via one or more diffuser segments, and/or the kind of data to be displayed. The user may, for example, select different information sources for different diffuser segments, configure a given diffuser segment to switch between several different types of informational messages at specified rates (e.g., a diffuser segment may be configured to show an indication of the number of unread e-mail messages for five seconds, and an indication of the weather the following five seconds) and so on. After the data sources and the durations for which the informational messages of various types have been determined, the contents of specific message or messages to be displayed during a given time interval (e.g., the numeral "5" to indicate five new e-mail messages, or a red exclamation mark symbol to indicate an indication of inclement weather in the near future) may be determined, and the appropriate signals may be sent to the diffuser segments. It is noted that at least in some embodiments, the amount of power needed for the informational messages displayed using diffuser segments may be low enough that such messages may be displayed even while the electronic device itself is in a low power mode, e.g., while the laptop/phone/tablet/camera is in a sleep mode, hibernation mode, or a restricted-functionality mode such as an airplane mode. In some embodiments in which diffuser-based information display is supported during low power modes or restricted functionality modes, an additional step of wiping the diffuser display may be added to the shutdown process of the electronic device, in order to fully clear the diffuser display and avoid indeterminate or scrambled diffuser display contents.

Seven example diffuser areas or locations are shown on the front face 1051. Diffuser area 1010A lies along the light path of a front-facing camera, while diffuser area 1010B lies along the light path of a front-facing flash associated with the front-facing camera. The portion of the front face that does not comprise the touch screen 1020 may be referred to as the "bezel" or "bezel area". A number of diffusers may be deployed at various portions of the bezel in some embodiments, and may be used for various purposes including displays of information, logos, or advertisements. On front face 1051, for example, diffuser areas 1010C and 1010B may be located on the top bezel, i.e., above the touch screen. Diffuser area 1010D may be located on the left bezel, and diffuser area 1010F may be located on the bottom bezel. A diffuser 1010G may overlap with a portion of touch screen 1051 in the depicted embodiment.

Four examples of diffusers are shown on the rear face 1050 of the tablet. Among these, one diffuser area (1030A) may overlap the rear-facing camera window, one (1030B) may overlap with the rear flash window, while the remaining two (1030C and 1030D) may be positioned at arbitrary locations on the rear face 1050 in the depicted embodiment.

In some embodiments, when a particular diffuser such as 1010F is set at maximum transparency, the opaque surface of the underlying front or back encasing may be revealed, and when the diffusivity is increased, the diffuser area may appear "cloudy" or "frosted". In some embodiments, diffuser colors (or apparent diffuser colors) may be modifiable via electrical signals and/or with the help of supplemental light sources similar to those discussed above. In some embodiments, changes to the appearance of different combinations of diffuser areas (such as 1010C, 1010D, 101E, and 1010F) may be coordinated—e.g., as one diffuser is made more opaque via applied signals, the others may also be made more opaque. In other embodiments, the appearance of a given diffuser may be manipulated independently of the others. In at least some embodiments, indicators of application state or other information elements or advertisements may be shown using portions of a sectioned diffuser (similar to the sectioned diffuser shown in FIGS. 8A and 8B)—e.g., in FIG. 10, an advertisement is shown in diffuser area 1010C, a logo is shown in 1030D and application status is shown in diffuser area 1010G. In some embodiments at least some portions of the diffusers may be employed for aesthetic reasons, e.g., to enhance the look and feel of the electronic device. It is noted that the various diffuser areas shown on the front and rear faces of the depicted tablet device may not all be implemented in a given embodiment—e.g., only a subset of the eleven diffusers shown in FIG. 10 may be implemented. Diffuser segments may be attached for similar types of information display to various other types of devices, including phones, cameras, televisions, personal computers of various kinds including laptops and desktops, watches, and the like. In at least some of these devices, the primary display (e.g., a touch screen or a laptop screen) and the diffuser segment(s) may be attached to, or appear to be part of, the same encasing or enclosure. In one embodiment, supplementary light sources similar to those illustrated in FIG. 9A-9D may be used in combination with diffuser segments for information display—e.g., part of an informational message may be conveyed using a supplementary light source, and part using a diffuser segment. In some embodiments, the information may be displayed and/or enhanced using visual contrasts—e.g., light versus dark or positive-versus negative space contrasts with the surrounding or background portions of the encasing, silhouetting, and the like. Supplementary light sources (in some cases, including options for lighting of different colors) may also be used in some implementations that are configured to utilize contrast for informational display or emphasis. In various embodiments, users may be able to select the information sources for the diffuser-based displays, or disable/enable information display via the diffusers, e.g., using configuration requests submitted via settings menus available via touch screens, keyboards, mice, remote controls, and/or various other types of interfaces. In addition to controlling/selecting the information sources, in at least some embodiments users may also be able to specify other features of the diffuser-based displays, such as the specific optical characteristics (e.g., the color, diffusivity) and/or fonts to be used for various types of messages, multiplexing rates (e.g., time intervals for different types of messages to be displayed), and the like. In some embodiments, some users familiar with one or more programming languages may be provided guidance on how to program the diffuser-based displays to display various kinds of information. In at least some embodiments, user-selected or application-related artwork may be displayed with the help of the diffuser segments—e.g., book covers related to e-reader applications, album covers or musician photographs related to music applications, game logos associated with gaming applications, photographs associated with photo-sharing or photo-enhancement applications, and/or other images selected by users may be shown.

Changing Angular Sensitivity of Ambient Light Sensors Using Diffusers

Figure 11A:
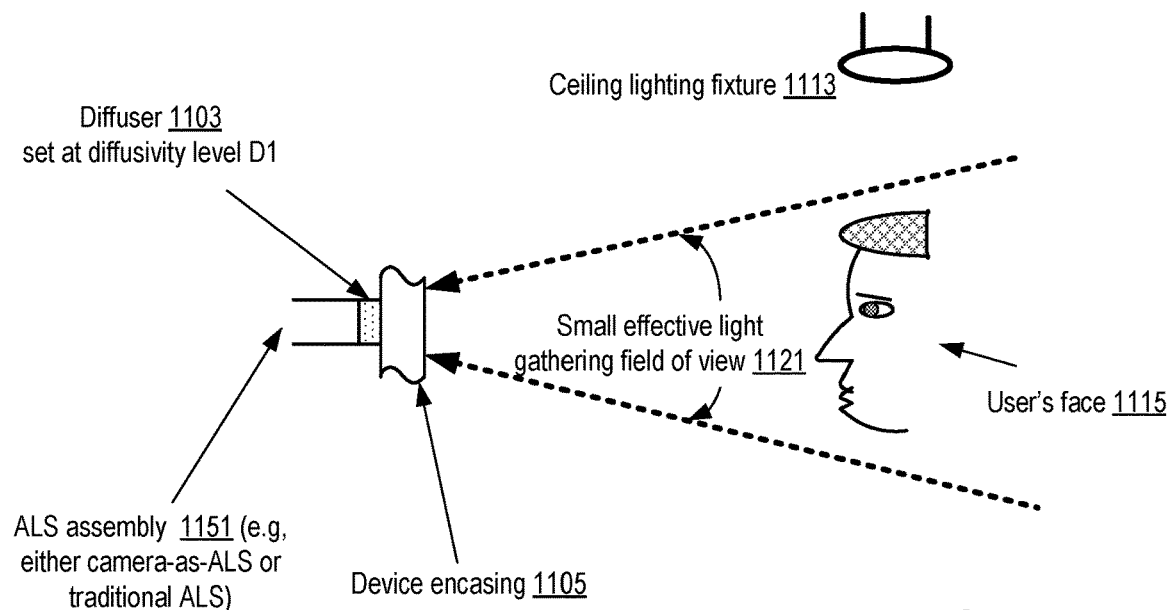
FIG. 11A and FIG. 11B illustrate the use of diffusers for varying the angular sensitivity of an ambient light sensor, according to at least some embodiments.
Figure 11B:
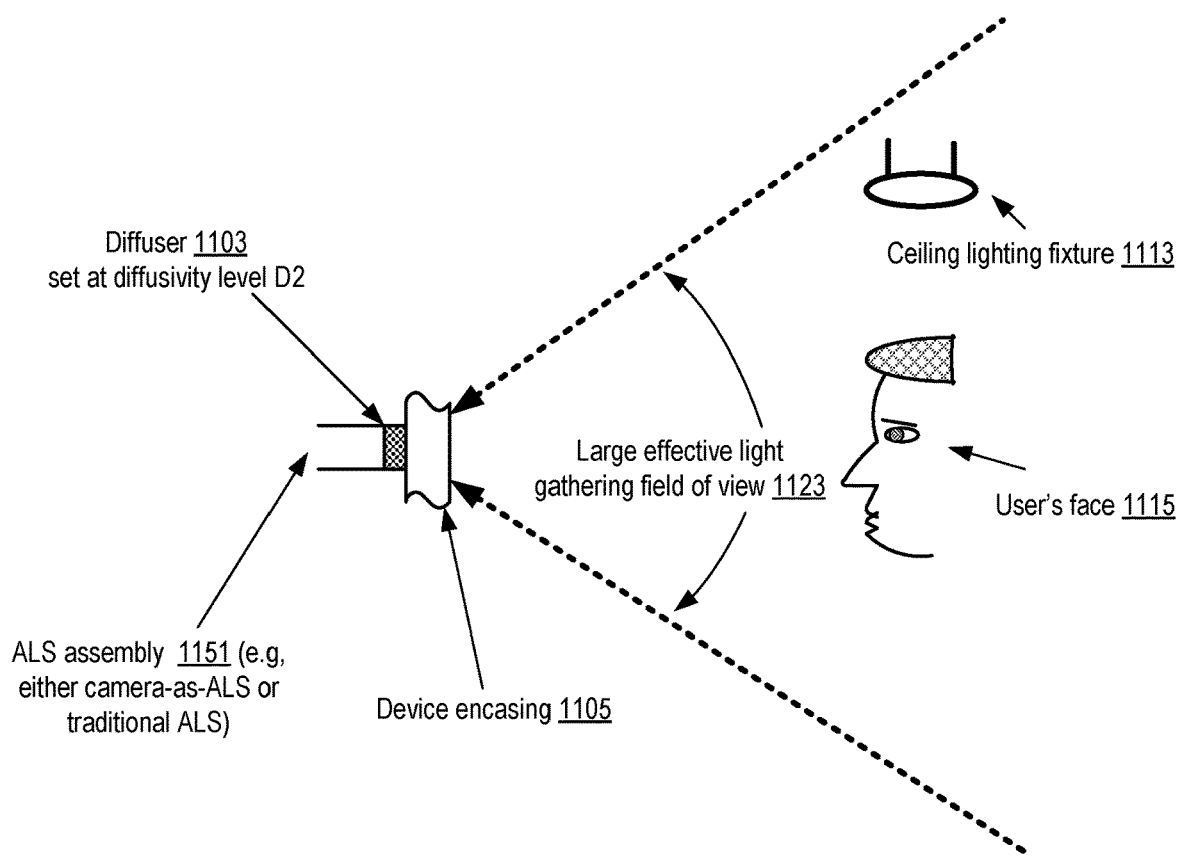

FIG. 11A and FIG. 11B illustrate the use of diffusers for varying the angular sensitivity of an ambient light sensor, according to at least some embodiments. Diffusers may be used for this purpose with either traditional (e.g., photodiode-based) ambient light sensors, or with camera-based ambient light sensors. When the diffusivity of diffuser 1003 associated with an ALS assembly 1151 is set to one setting D1 (e.g., a low diffusivity or high transparency setting), the effective angle of view (or light gathering field of view) of the ALS may be relatively small, as shown in FIG. 11A. That is, while the light reflected from an exterior object (like face 1115) that is located close to the central axis of the light path through the device encasing 1105 may be captured (or given higher weight) for ambient light level detection, light from sources located away from the central axis of the light path (such as a ceiling light fixture 1113) may not have as much of an impact on the detection of ambient light.

If the diffusivity is changed to a different level D2, as shown in FIG. 11B, the effective angle or field of view may be increased, i.e., light sources within a wider cone may be given greater weight in the determination of the ambient light level. Thus, with a wider angular sensitivity resulting from diffusivity setting D2, light received from ceiling light fixture 1113 may be given greater prominence in the ambient light calculation than it was with diffusivity set to D1. Light from more centrally aligned sources such as the user's face may still be included in the ambient light determination, but may not be as important in the final determination of ambient light as it was in the scenario illustrated in FIG. 11A. As noted above, in some embodiments an adaptive process of ambient light detection may be implemented, in which more than one reading of ambient light is obtained, with the diffusivity modified to vary the angular sensitivity of the ALS as desired for the different readings, based on input from such sources as face detection algorithms, proximity sensors, and the like. The final measure of ambient light may be based on a combination of the readings in some embodiments, or may be based on the final reading in other embodiments.

Diffuser for Synchronization of Camera Image Sensor Exposure with Flash Illuminations In at least some embodiments, it may be possible to use a diffuser or a set of diffusers that is capable of being switched quickly between maximum opacity and maximum transparency, as a "virtual shutter" that can be used to ensure that the exposure of a digital camera's image sensor is timed appropriately with respect to a burst of illumination provided by a flash device being used. For example, some flash devices may produce very short-lived bursts of illumination, such that the duration for which the camera's image sensor is exposed may sometimes exceed the duration for which the targeted scene is illuminated by the flash. As a result, the image sensor may collect some light during periods when the flash is not illuminating at least some parts of the scene to the intended extent, which may in turn result in a less-than optimal photograph. By using a diffuser that can be switched quickly between near-opaque and near-transparent settings, it may become possible in at least some embodiments to ensure that the camera sensor only collects light from the scene while the scene is illuminated as intended.

Figure 12:
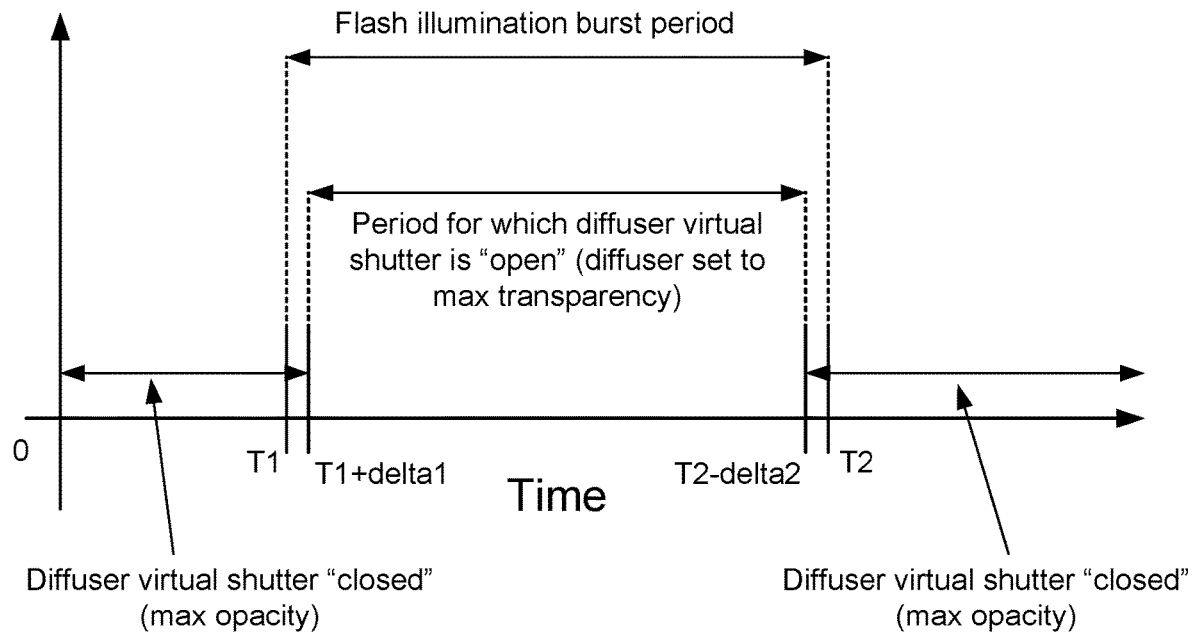
FIG. 12 is a timeline illustrating the use of a diffuser as a virtual shutter for synchronizing camera image sensor exposures to flash illuminations, according to at least some embodiments.

FIG. 12 is a timeline illustrating the use of a diffuser as a virtual shutter for synchronizing camera image sensor exposures to flash illuminations, according to at least some embodiments. Before time T1 on the timeline (between the origin of the timeline and T1), the diffuser may be set to maximum opacity, so that no light from the external scene (or very little light) reaches the image sensor of the camera. At time T1, the flash illumination burst may begin. Software instructions for manipulating the diffuser's optical properties via electrical signals may quickly switch the diffuser to maximum transparency, such that by time T1+delta1, the diffuser reaches maximum transparency. The software may also be provided with the estimated duration of the flash illumination burst, i.e., the duration (T2−T1). Accordingly, shortly before T2 (e.g., at time (T2−delta2)), the software may switch the diffuser back to maximum opacity, such that the camera's image sensor does not get exposed to the scene after the illumination burst ends.

It is noted that such a technique for synchronizing image sensor exposure with a flash illumination burst may be employed with flashes of several different types and configurations. In some embodiments, an embedded or built-in flash may be used (similar to the built-in flash whose flash window 303 is shown in FIG. 3), while in others, an external flash device such as device 307 of FIG. 3 may be used. In at least some embodiments, the diffuser may be used for other purposes when the flash is not in use, such as for ALS, in which case the opacity of the diffuser may be set to some intermediate level (and not at maximum opacity) when the diffuser is being used for the other purposes.

Multiple Flash Modes Using Diffusers

In some embodiments, diffusers may be used to implement several different flash modes, such as fill-in flash mode or center-focused flash mode, either in concert with camera window diffusers or independently of camera window diffusers. For example, based on an initial analysis of the external scene to be imaged, it may be possible for a camera or a camera-equipped electronic device to determine such features of the scene as the proximity to a likely subject, the presence of one or more human or animal faces, the background versus foreground ambient light levels, the approximate rate or direction of motion of a likely subject, and so on. Such analyses may be performed with the help of any combination of various sensors and/or software modules present in the electronic device or camera, such as a proximity sensor, a motion detecting sensor, one or more ambient light sensors (either camera-enabled ALS or independent ambient light sensors), face detection software, orientation detection software, and the like. Accordingly, based on the initial analysis, instructions executable by one or more processors of the electronic device may be able to determine an optimum setting of the flash illumination appropriate for the desired photograph or video: e.g., whether the illumination from an available flash device should be spread over a wide cone, or should be more narrowly focused (e.g., on a face or faces detected in the scene). The instructions may then initiate a signal to one or more diffusers that are positioned in the outward light path of the flash device, to change the diffuser's optical properties such as diffusivity or opacity to an extent best suited to obtain the desired properties of the flash illumination.

Figure 13A:
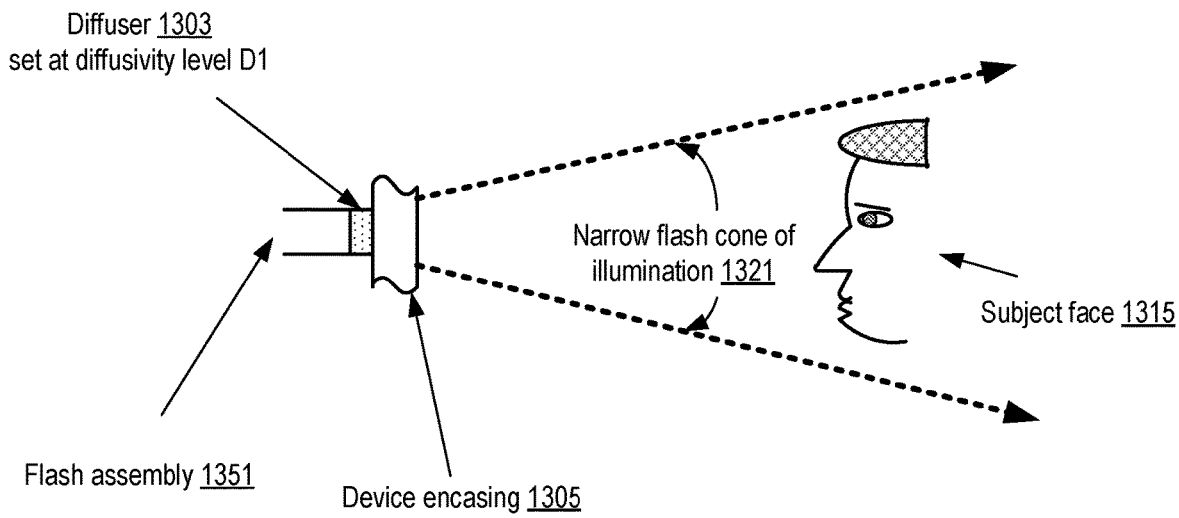
FIG. 13A and FIG. 13B illustrate the use of a diffuser to change the angle over which a flash light source illuminates a scene, according to at least some embodiments.
Figure 13B:
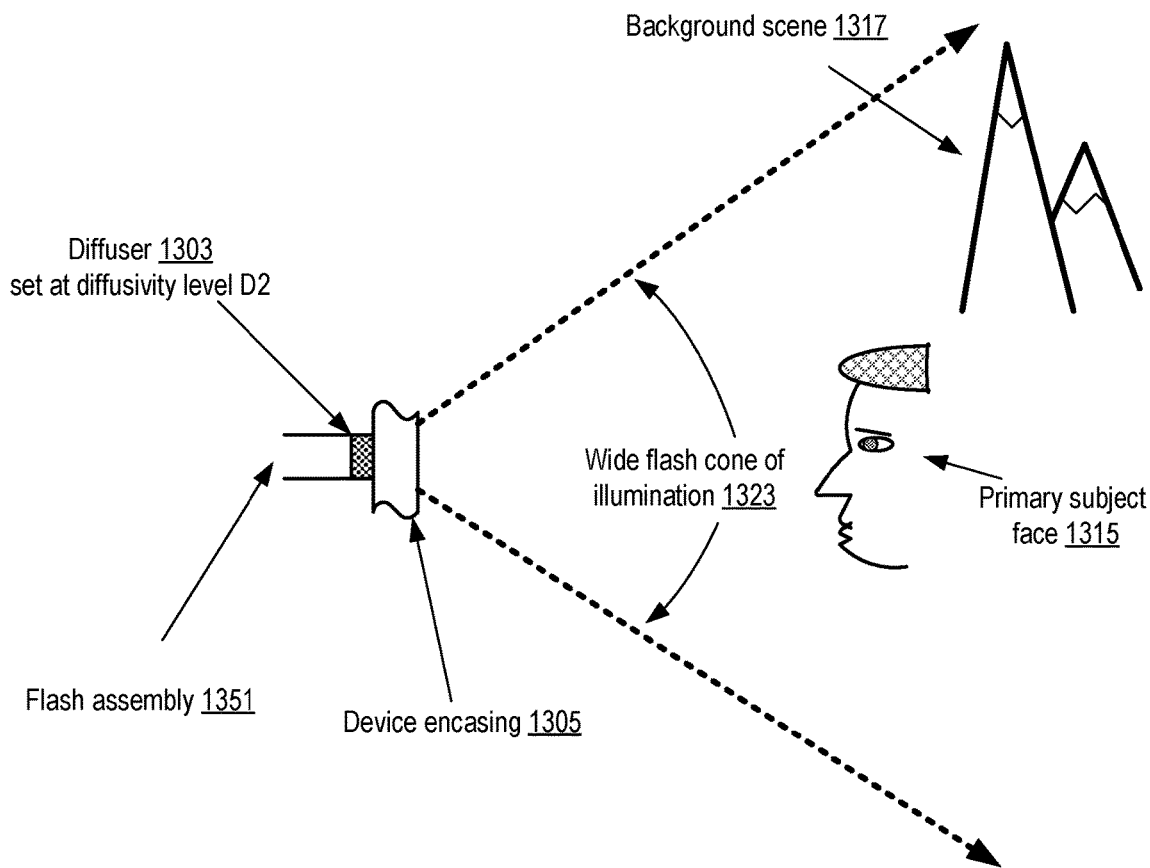

FIG. 13A and FIG. 13B illustrate the use of a diffuser to change the angle over which a flash light source illuminates a scene, according to at least some embodiments. As shown in FIG. 13A, a diffuser attached to the device encasing (e.g., a transparent flash window) 1305 in front of a flash assembly 1351 has its diffusivity set to a first level D1, which results in a relatively narrow flash cone of illumination 1321. The narrow cone of illumination lights a subject face 1315 positioned close to the central axis of the cone (i.e., close to a line perpendicular to the device encasing's face, extending outward from the flash light source). The diffusivity level D1 may have been reached as a result of a determination by software installed on the electronic device in which the flash device or camera is incorporated that the face 1315 is intended to be the main subject of the photograph or video. Having determined that the face 1315 should be well illuminated, the instructions may initiate the generation of a signals or signals (such as a particular voltage applied across the electrodes of the diffuser) to set the diffusivity level to D1.

In FIG. 13B, the diffusivity level has been set to a different level D2 than the level D1 shown in FIG. 13A. As a consequence, the flash illuminates a wider area of the external scene, as indicated by wide cone of illumination 1323. Diffusivity level D2 may have been selected by imaging or camera software of the electronic device, based on an initial analysis of the scene and a determination that at least some of the flash illumination should be targeted at the background scene 1317.

Figure 14:
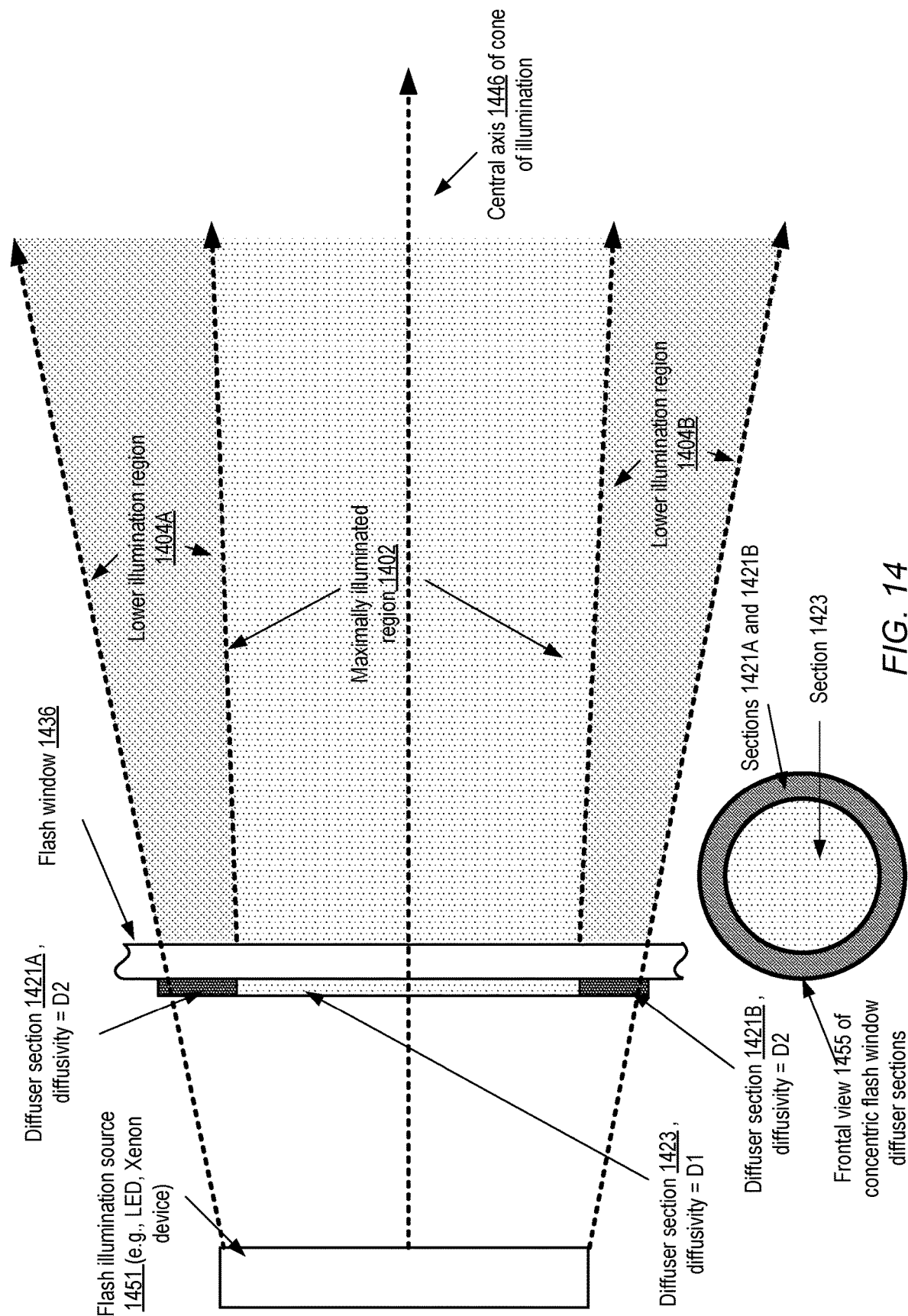
FIG. 14 illustrates the use of a flash window diffuser with a plurality of independently controllable regions, according to at least some embodiments.

In some embodiments, a flash window may be equipped with a more sophisticated diffuser or set of diffusers, such that different parts of the flash window can be configured with different diffusivity or opacity levels. FIG. 14 illustrates the use of a flash window diffuser with a plurality of independently controllable sections, according to at least some embodiments. Flash illumination source 1451 is located behind a diffuser comprising sections 1421A, 1421B and 1423 in the illustrated embodiment. Any desired type of illumination source may be used in different embodiments, such as one or more LEDs, xenon flashtubes or flash lamps, or flashtubes or lamps utilizing other gases such as krypton, argon, or a mixture of gases. In some embodiments, as illustrated in frontal view 1455, the central portion of flash window 1436 may have a circular section of diffuser material positioned around the central axis 1446 of the cone of illumination, and a second ring-shaped section (which appears as two separate sections 1421A and 1421B in the side cross-sectional view) may be positioned outside that central section.

Based on analysis performed using inputs from various sources (such as a camera-based ALS, a conventional non-camera ALS, face detection software, proximity sensors and the like), instructions executing on the electronic device may have identified the diffusivity levels D2 and D1 to be used for the different sections. As a result, the appropriate signals may have been sent to the diffuser sections, making the outer sections 1421 more diffuse or darker than the inner section 1423. A central region of illumination 1402 surrounding the central axis may thus be maximally illuminated due to diffusivity setting D1 of section 1423, while outer regions 1404A and 1404B may be less well illuminated due to the setting D2 of diffuser sections 1421. More complex configurations of diffusers may be implemented in some embodiments, in which for example different levels of illumination may be provided for an upper portion of the scene, versus a lower portion and/or a central portion. Such features may be referred to as "flash steering" in some embodiments. Multiple segments of flash diffusers, arranged in a manner similar to that illustrated in FIG. 6F or FIG. 8B for camera diffusers, may be used for flash steering and/or various flash modes of operation in some embodiments.

It is noted that at least some embodiments, diffuser settings for flashes (such as settings D1 and D2 of FIG. 13 and FIG. 14) may be adjustable manually (e.g., in response to input received from a user) instead of automatically (e.g., based on software analysis as described above). In some embodiments, the diffuser settings may be adjusted based on both automated analysis and user input, e.g., the device may suggest diffuser settings to the user and the user may decide to implement some or all of the suggested settings or override some of the suggestions. It is also noted that at least in some embodiments, any combination of the various techniques for using and placement of diffusers that have been illustrated in FIG. 1-FIG. 14 may be used in a given implementation. Flash diffusers may also be used for some of the message display and/or aesthetic reasons described earlier in the context of camera diffusers. For example, a flash unit may be hidden behind a colored or frosted diffuser for decorative or cosmetic purposes in some implementations when the flash unit is not in use.

Methods Utilizing Diffusers

Figure 15:
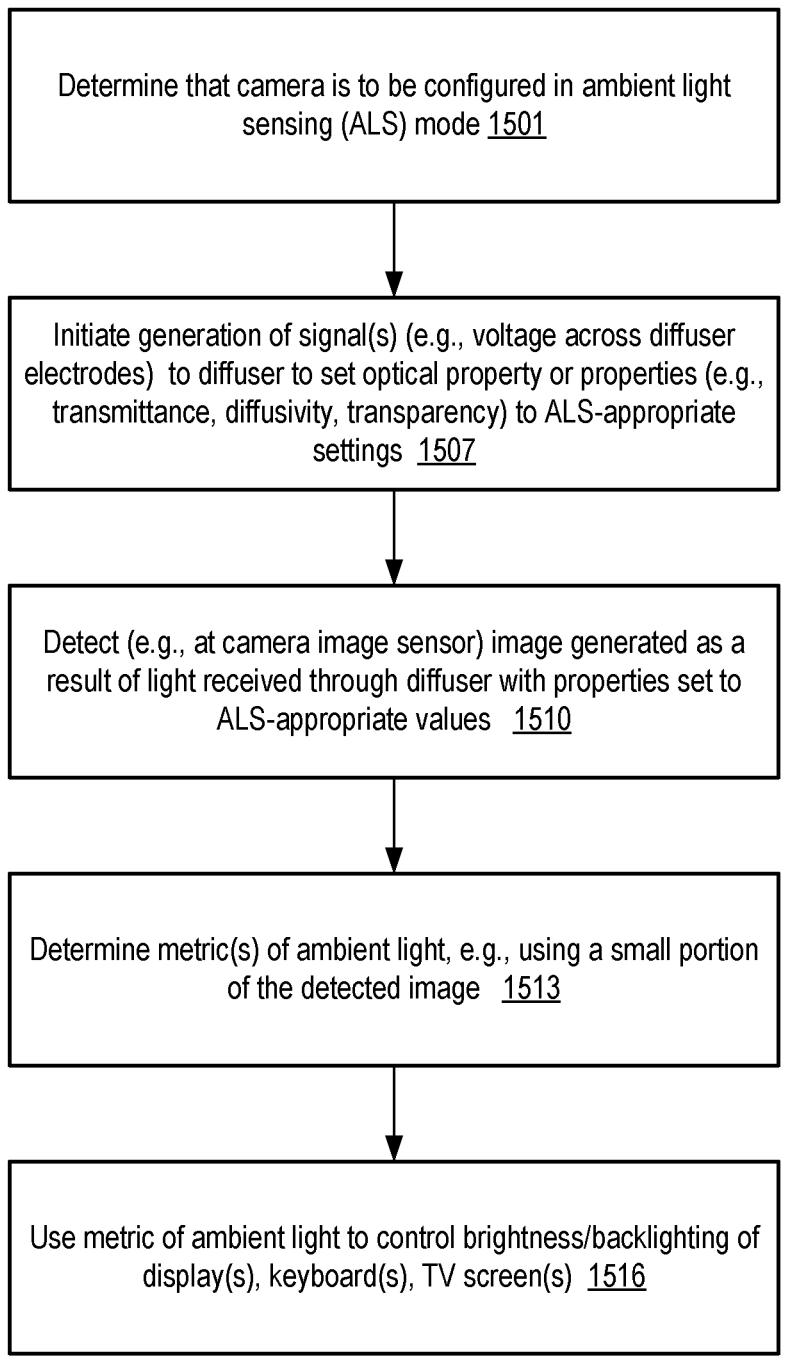
FIG. 15 is a flow diagram illustrating aspects of the operation of an electronic device configurable to sense ambient light using a digital camera with a diffuser, according to at least some embodiments.

FIG. 15 is a flow diagram illustrating aspects of the operation of an electronic device configurable to sense ambient light using a diffuser with a digital camera, according to at least some embodiments. One or more layers of a diffuser material (such as a PDLC layer or film) whose optical properties can be changed or switched via electrical signals may be positioned between the lens of the camera and the exterior of the electronic device, e.g., by attaching the layer or layers to the transparent encasing or window in the light path of the camera. As shown in element 1501, a determination may be made that the diffuser-equipped digital camera is to be configured in an ambient light sensing (ALS) mode. The determination may be based on various factors in different embodiments, such as in response to a detection that a software camera application that was in use has been shut down, that it has been X minutes since the camera application was last used, or because a user has provided input via one or more interfaces to switch the camera to ALS mode. Program instructions may be executed on one or more processors of the electronic device to make the determination in at least some embodiments.

One or more diffuser optical property settings (e.g., a diffusivity setting, a transmittance setting, or a transparency setting) to be used for ambient light sensing using the camera may be determined. In some embodiments, the settings may be determined by the instructions based on results of tests that were originally conducted during design or development of the electronic device—e.g., during the development process, the ability of the camera and its associated software to make sufficiently accurate measurements of the ambient light may have been calibrated as the optical properties of the diffuser were changed. An indication of the optimum settings (or several usable settings) may have been included in the program instructions executable on the electronic device. Information about the type and characteristics of signals to be transmitted or applied to the diffuser to achieve the desired optical property setting may also be included in the program instructions in some embodiments. The program instructions may initiate the transmission of the required signals to the diffuser (element 1507 of FIG. 15).

Depending for example on the specific diffuser material being used, the switching time taken to modify the diffuser's optical property or properties to the state useful for ALS may vary in different implementations. After the desired optical properties have been achieved, light received through the diffuser may be detected at the camera's image sensor (element 1510). Because of the diffuser's optical properties, such as an increased diffusivity or decreased transmittance, the image detected through the diffuser for ALS may include less clear contrasts, be "smoothed" or otherwise distorted compared to the image that may have been detected without the diffuser in place. It may therefore be possible to use only a portion of the image detected (such as the equivalent of a few thousand pixels in the central portion of the image) instead of the whole image (which may comprise several million pixels) to determine one or more metrics of the ambient light level (element 1513), at least in some implementations. Using a portion of the image may require less computation (and therefore less time, and less power) than using the whole image. The metric(s) of ambient light thus determined may be used to adjust or control the brightness or backlighting levels of various components or peripherals such as touch screens, displays, keyboards and the like (element 1516) in the depicted embodiments. In some cases, the components whose brightness or backlighting is adjusted may be associated with the electronic device with the ALS-enabled camera (e.g., the brightness of a touch screen of a phone may be adjusted based on the measures of ambient light determined using the phone's camera), while in other cases the adjusted components may be part of other electronic devices in the same room (or in an area with similar levels of ambient lighting) as the ALS-determining camera. For example, it may be possible to measure the ambient lighting in a room with a smart phone's ALS-enabled camera, and use the measurement to control the brightness of a TV in the room via a control signal sent wirelessly from the phone.

Figure 16:
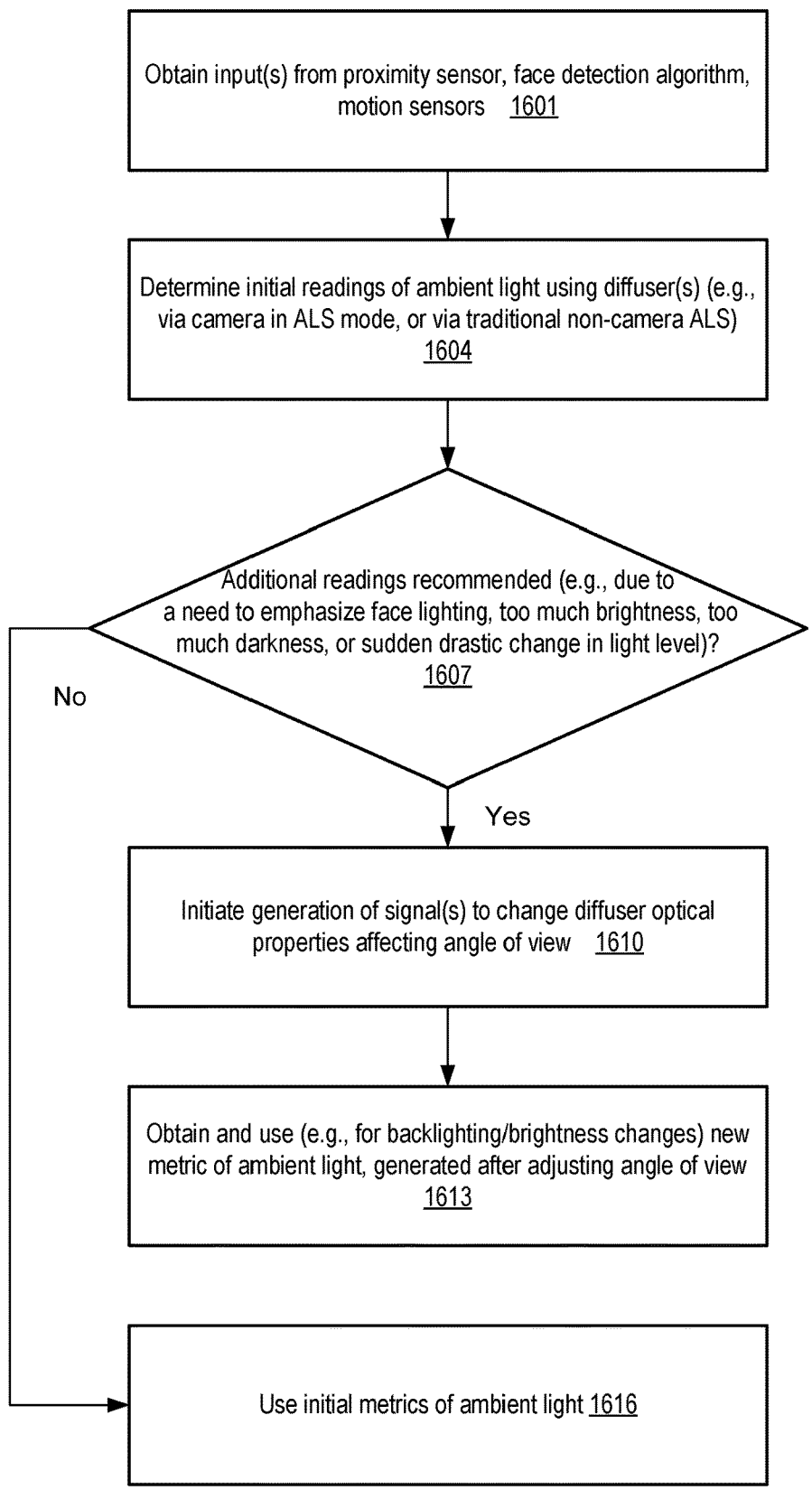
FIG. 16 is a flow diagram illustrating aspects of the operation of an electronic device configured to measure ambient lighting levels by adjusting the light gathering field of view of a sensor using a diffuser, according to at least some embodiments.

In some embodiments, an iterative or adaptive process may be used to determine the measure of ambient lighting with the help of a diffuser. FIG. 16 is a flow diagram illustrating aspects of the operation of an electronic device configured to measure ambient lighting levels by adjusting the angle of view of a sensor using a diffuser, according to at least some embodiments. The techniques illustrated in FIG. 16 may be used with a traditional ambient light sensor (e.g., an ALS implemented using one or more photodiodes independent of a camera) or a camera-based ambient light sensor in various embodiments. In the depicted embodiment, instructions executed at one or more processors of the electronic device may obtain any combination of a number of inputs regarding the exterior of the device, such as inputs from a proximity sensor, a face detecting algorithm or module, a motion detector, an orientation detector, and the like (element 1601). An initial reading or measurement of the ambient light may also be obtained, e.g., via the camera-enabled or camera-independent ALS (1604).

The instructions may then determine whether additional readings of the ambient light should be taken. A number of factors may be considered when making this decision in different embodiments—for example, the instructions may determine that a face of a user of the device has been detected, but the initial reading did not emphasize or weigh the light from the face higher than the light from other sources to a desired extent; or, a sudden change in darkness or brightness relative to a previous measurement may be detected (as when the device is taken from a brightly lit outdoor environment to a dark room); or the initial measure may simply be at an extreme of lightness or darkness. In some cases it may be determined that additional readings should be taken to confirm the initial reading, or the program code being used may simply comprise logic to always take multiple readings before arriving at a measure of ambient lighting. If a decision to take an additional reading is made (element 1607), the instructions may initiate the generation of signals to change the optical properties of a diffuser positioned in the light path of the sensor being used (e.g., in the case of a camera-based ALS, the diffuser positioned between the lens of the camera and the exterior, and in the case of a traditional ALS, the diffuser positioned between the traditional ALS and the exterior of the electronic device) to modify the angle of view or angular sensitivity (element 1610). The nature and extent of the change to the angular sensitivity (e.g., whether the angle of view is to be increased or decreased, and by how much) may be dependent on the factors that led to the decision to obtain additional readings—e.g., whether face lighting is to be emphasized, or whether the environment is initially determined to be extremely bright. The diffusivity may be increased to increase the angle of view in some embodiments, or decreased to reduce the angle of view.

After the angle of view has been modified, a new reading of the ambient light may be obtained (element 1613) and this new reading (either by itself, or in combination with the earlier reading) may be used to adjust the brightness or backlighting of various components as discussed earlier with reference to FIG. 15. If a decision not to take new readings were made (element 1607), the initial reading of ambient lighting may be used. In some embodiments, the process of taking new readings with different angles of view may be repeated for several iterations before a final measure of ambient light for the current location of the device is made.

As described above, in some embodiments a digital camera of an electronic device may be usable in multiple modes, including one or photography modes and one or more non-photography or background modes such as an ALS mode. Users of such devices may be concerned about possible privacy violations while the camera is in use for background functions—e.g., a user may not wish to be photographed inadvertently. Accordingly, a privacy screen that prevents the capture of recognizable images may be implemented, and/or a visual indicator using one or more diffusers may be provided to the user that the camera is not in photography mode. A combined privacy screen and privacy indicator may have two functions in some embodiments—first, it may inform the user that the camera is not being used for photography or video, and second, its optical state and physical position in front of the camera lens may ensure that the camera cannot be used for photography (i.e., the indicator may block so much of the light to the camera, or make the image detectable so distorted, blurred or diffuse that even if an attempt to capture a photograph or video were made, the result would be unrecognizable as a representation of the scene).

Figure 17:
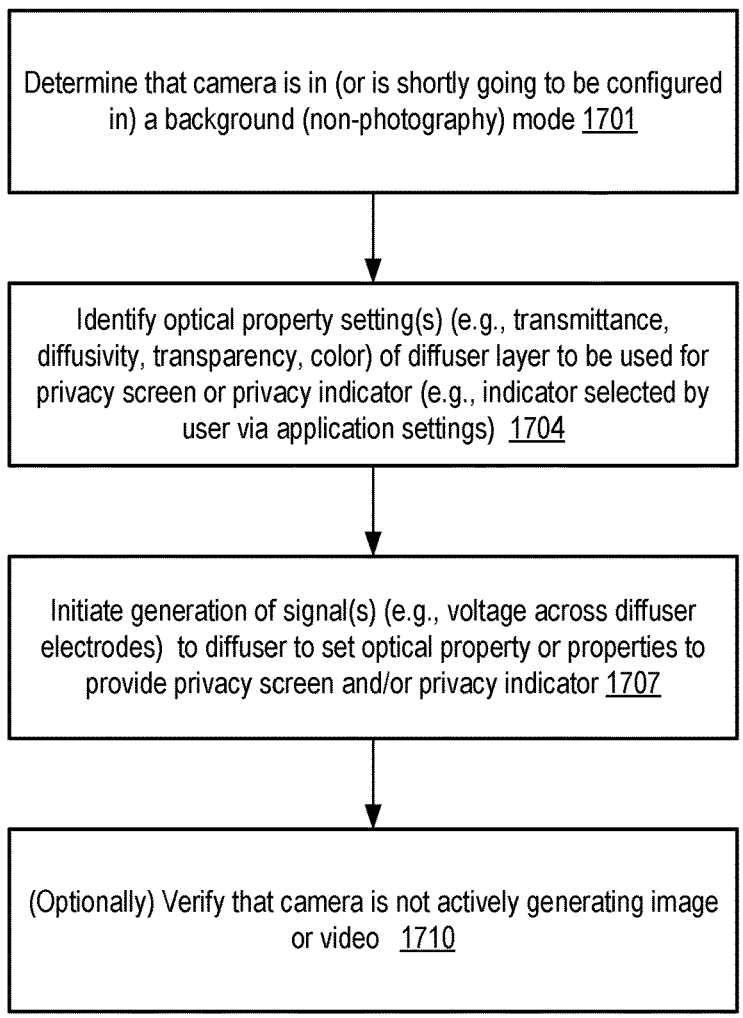
FIG. 17 is a flow diagram illustrating aspects of the operation of an electronic device configured to provide a privacy indicator using a diffuser, according to at least some embodiments.

FIG. 17 is a flow diagram illustrating aspects of the operation of an electronic device configured to provide a privacy screen and/or a privacy indicator using a diffuser, according to at least some embodiments. As shown in element 1701 of FIG. 17, instructions executed on a processor or processors of the electronic device may determine that the camera is in (or is shortly going to be configured in) a background or non-photography mode of operation. For example, the default mode of operation of the camera may be an ALS mode, and the camera may be placed in ALS mode either automatically or as a result of user input. The instructions may determine the optical properties of a diffuser (positioned on the light path of the camera) to be used for the privacy screen or privacy indicator (element 1704). Such properties may include any combination of diffusivity, transparency, color, opacity, a "cloudy" or frosted appearance, or other visible properties, in various embodiments. In some embodiments, a user may be able to specify the visual properties to be used for privacy screen or indication, e.g., from among a set of supported options. The instructions may initiate the generation of appropriate signals to the diffuser to achieve the desired visual effect or effects (element 1707), and to ensure that any image that is gathered while the diffuser is in use as a privacy screen is so distorted (e.g., blurred or diffused) that it cannot be recognized as a representation of the external scene. In some embodiments, the instructions may optionally verify that the camera is actually not generating still or video images while it is being used for background-mode operations. In at least one embodiment, the privacy indicator may be displayed even if the camera is not being used for any background operations, e.g., the privacy indicator may simply serve to inform users and/or bystanders that the camera is not being used for photography.

Figure 18:
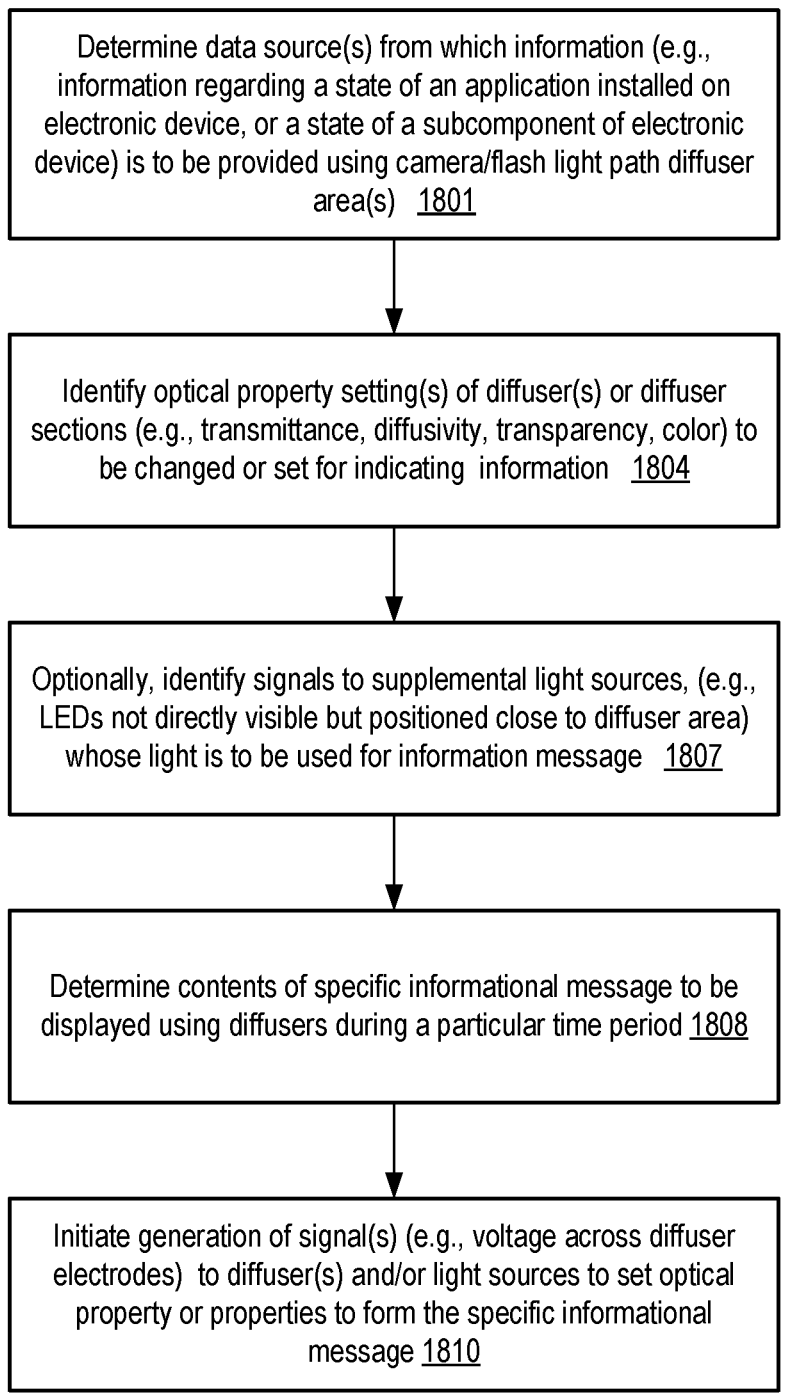
FIG. 18 is a flow diagram illustrating aspects of the operation of an electronic device configurable to provide a display of state information using a diffuser positioned in a camera light path or a flash illumination path, according to at least some embodiments.

FIG. 18 is a flow diagram illustrating aspects of the operation of an electronic device configurable to provide a display of state information using a diffuser positioned in a camera light path or a flash illumination path, according to at least some embodiments. As illustrated in FIG. 8A, FIG. 8B, and FIG. 9, it may be possible to use different types of camera and/or flash diffuser configuration to display various messages or state information. Instructions executed on a processor of the electronic device may identify the data sources (e.g., email clients, battery management software, weather applications) from which messages or information are to be displayed using the camera diffuser and/or flash diffuser (element 1801). In some embodiments, such displays may only be desired during periods when the camera and/or flash are in background mode or in an "off" state, and the determination of the message contents may be made when the camera or flash is about to enter the background mode or off state. Users may be allowed to configure the electronic device to select the types of information they wish to have displayed in some embodiments—e.g., a user may indicate via a diffuser display configuration request that if the battery of the device reaches a threshold charge level, an indication is to be provided using the camera diffuser.

The optical properties to be modified for the message display or state display may be determined (element 1804). The mapping between the information or message to be displayed, and the visual appearance of the diffuser that is to be used to convey the information, may also be selectable by users in some embodiments—e.g., a user may indicate that a red indicator is to be used to inform the user about low charge on a battery. In at least some implementations, supplemental light sources may be used to help with the information display—e.g., one or more LEDs may be positioned near the camera/flash window as shown in FIG. 9. In such implementations, the signals to be sent to the supplemental light sources may be determined as well (element 1807). In at least some embodiments, the specific contents of the informational message to be indicated using the diffuser may change for different time periods. Thus, depending for example on the preferences of the user as indicated by a configuration setting or request, the informational message may change every X seconds, or may be displayed every Y seconds followed by a period of Z seconds with no informational message being displayed. For a given time period during which the diffuser is to be used for information display, the contents of the corresponding information (e.g., the number of currently unread e-mails may be determined) for that time period may be determined (element 1808). The instructions may then initiate the generation of the appropriate signals to the diffuser(s) and/or the supplemental light sources such that the desired information is indicated through the diffusers (element 1810). In some embodiments employing supplemental light sources, properties of just the supplemental light sources may be changed for the information display, while in others properties of both the diffusers and the supplemental light sources may be changed.

Figure 19:
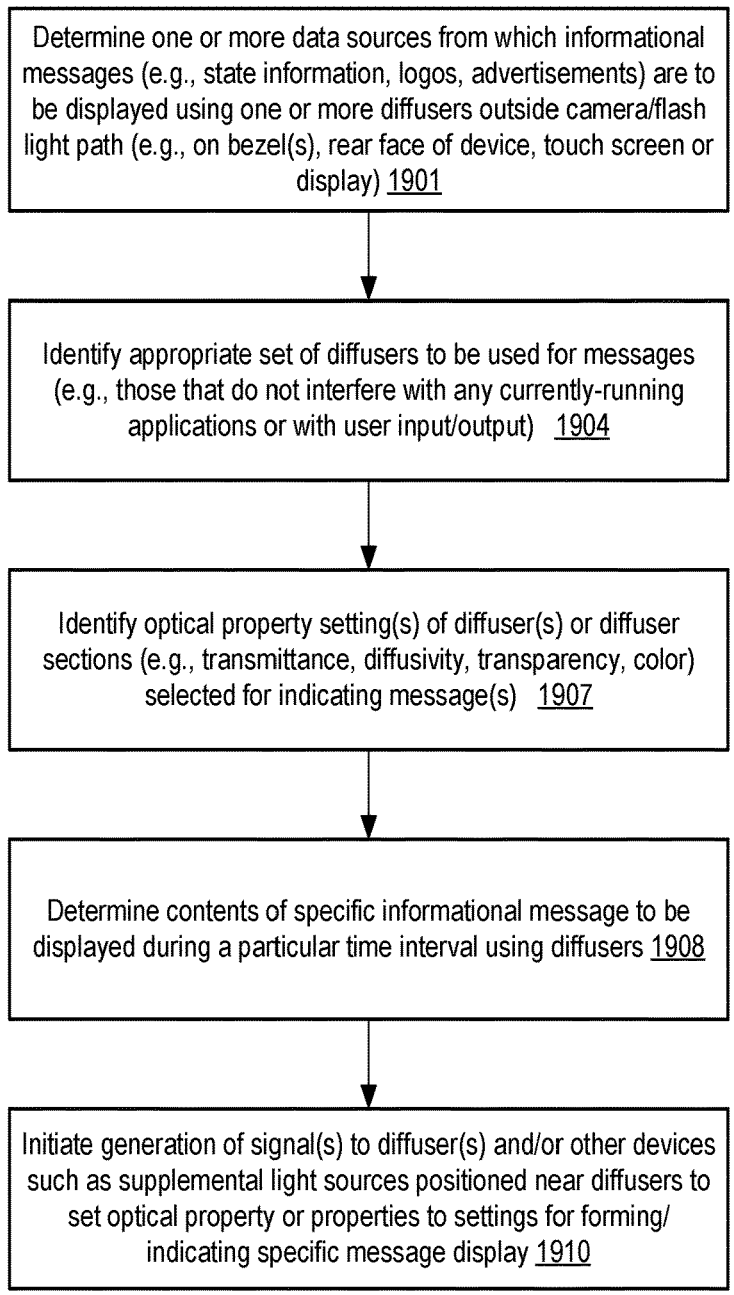
FIG. 19 is a flow diagram illustrating aspects of the operation of an electronic device configurable to display message indicators using one or more diffusers positioned away from a camera light path or a flash illumination path, according to at least some embodiments.

FIG. 19 is a flow diagram illustrating aspects of the operation of an electronic device configurable to display message indicators using one or more diffusers positioned away from a camera light path or a flash illumination path, according to at least some embodiments. As illustrated in FIG. 10, diffusers may be positioned in several locations on the exterior of an electronic device other than camera or flash light paths in some embodiments, and may be used for displaying various types of messages such as indications of application state, advertisements, logos, artwork, and the like. As shown in element 1901 of FIG. 19, instructions executing on a processor or processors of such an electronic device may determine the data sources from which contents of one or more messages to be displayed using the diffusers may be obtained. As at least some of the diffusers to be used are not along the light paths of the camera or flash, they may be used for message displays independently of whether the camera/flash is being used for photography or not, and regardless of whether the camera or flash is even equipped with diffusers. In some embodiments, diffusers may be used for informational display even while the electronic device (e.g., camera, phone, tablet or laptop) is in a low power mode or a restricted-capability mode.

In the depicted embodiment, the instructions may identify the set of diffusers to be used for the messages (element 1904)—e.g., only those diffusers may be selected for the messages whose optical properties can be modified without interfering with any running applications or with user input/output. In some embodiments, users may be able to enable or disable specific diffusers for message display, or the invocation of a particular application on the electronic device may result in the automatic disablement of some diffusers (e.g., as long as an application A is running on a tablet device, a particular diffuser D may not be available for message display). Having identified an appropriate set of diffusers, the instructions may determine the optical properties to be changed or set for the one or more diffusers to be used for message display (element 1907). The specific contents of the informational message to be displayed at a given time, or for a given length of time, may then be determined (element 1908). The instructions may initiate the generation of signals to the diffusers to set their optical properties as desired so that the message content is visible to the user or other viewers of the electronic device (element 1910). In some embodiments, supplemental light sources may also be used for diffusers that are positioned out of the light path of cameras or flashes, and signals to activate such supplemental light sources may also be initiated. As described above with respect to FIG. 18, various aspects of the message display may be under optional user control in some embodiments, such as the types of information a user wants displayed, or the way that information content is mapped to the visual appearance of the diffusers. In some embodiments, visual contrast between the diffuser layer and its surroundings or background (e.g., light versus dark silhouetting, or a perception of positive versus negative space) may be used for information display. In various embodiments, informational messages may be formed by the diffuser (or a portion of the diffuser) itself, e.g., without relying on views of other portions of the electronic device (such as additional displays) through the diffuser layer. In such embodiments, the portion or portions of the diffuser whose optical properties are modified to indicate the information may represent the primary display device for the information, not a "window" through which a different display indicating the message is visible.

Figure 20:
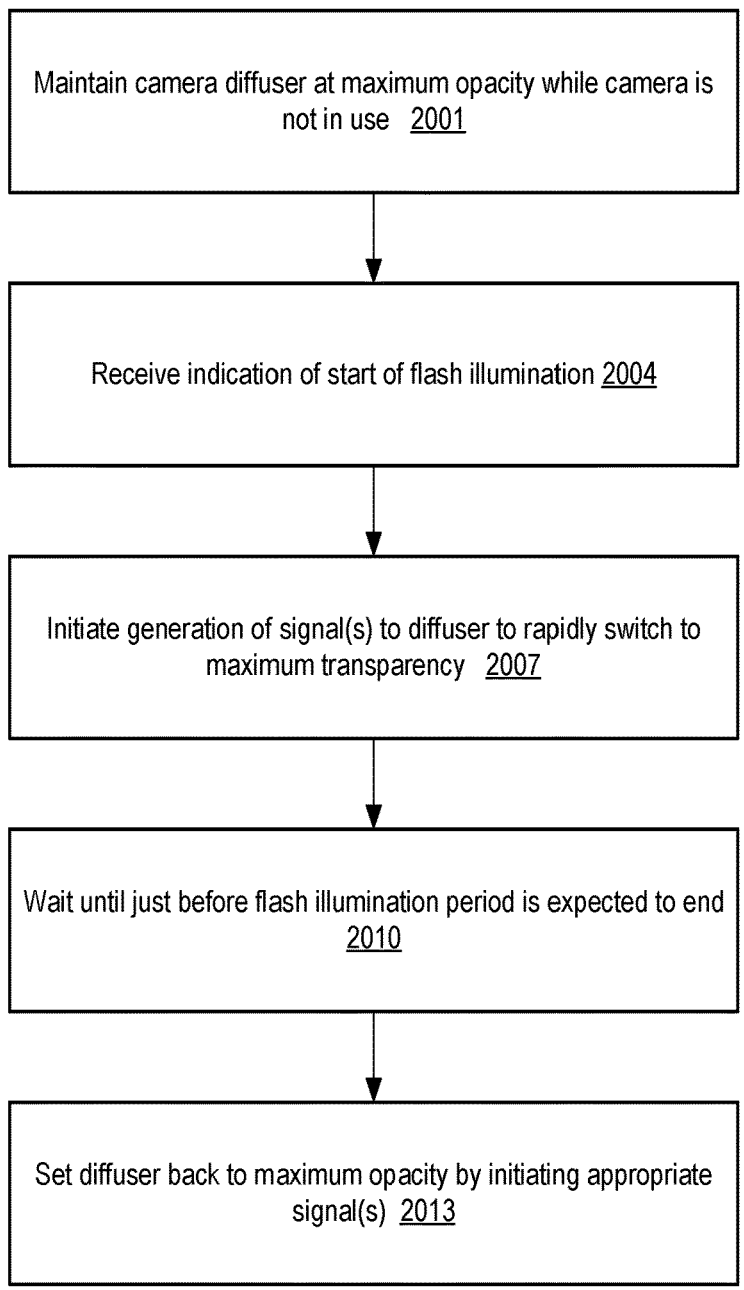
FIG. 20 is a flow diagram illustrating aspects of the operation of an electronic device configurable to use a diffuser to control the timing of an exposure of a camera sensor to light from a flash illumination source, according to at least some embodiments.

FIG. 20 is a flow diagram illustrating aspects of the operation of an electronic device configurable to use a diffuser to control the timing of an exposure of a camera sensor to light from a flash illumination source, according to at least some embodiments. In the depicted embodiment, a diffuser that can be switched rapidly from maximum opacity to maximum transparency may be positioned between a camera lens and the exterior of an electronic device for which a flash (either a built-in flash, or an external flash) is available for use. The diffuser may be set and maintained at maximum opacity while the camera is not in use (element 2001). It is noted that the diffuser may be configurable for ALS purposes in some embodiments, in which case the diffuser may be maintained at an opacity less than the maximum opacity during periods when the camera is in ALS mode. Instructions executed on a processor of the electronic device may receive an indication of the start of a flash illumination burst or period (element 2004). Such an indication may be received from the image processing software being used for the camera in some embodiments.

The instructions may initiate the generation of one or more signals to the diffuser to switch to maximum transparency (element 2007), so that the scene as illuminated by the flash can be detected by the camera's image sensor. The timing of the transition to maximum transparency, relative to the start of the illumination (e.g., as illustrated in FIG. 12 above) may be governed at least to some extent by the nature of the diffuser materials being used in various implementations. The instructions may wait until just before the illumination period is expected to end (as also shown in FIG. 12) (element 2010). The diffuser may then be switched back to maximum opacity (element 2013) in the depicted embodiment. In this way, the instructions may attempt to ensure that the scene is captured in the image generated by the camera sensor with the intended level of illumination provided by the flash, and that periods when the scene was not well illuminated do not affect the quality of the image.

Figure 21:
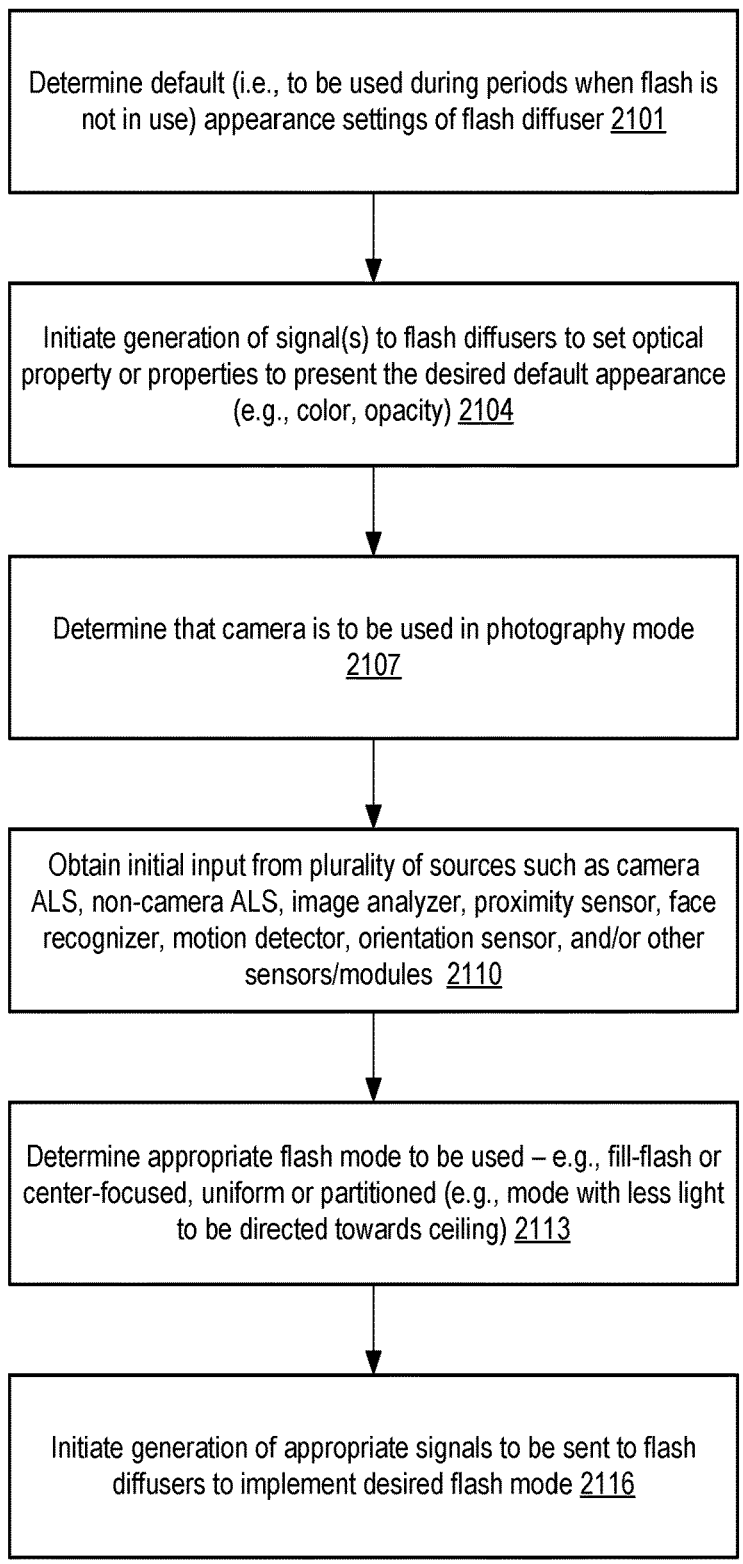
FIG. 21 is a flow diagram illustrating aspects of the operation of an electronic device configurable to use a diffuser to implement a plurality of flash modes, according to at least some embodiments.

FIG. 21 is a flow diagram illustrating aspects of the operation of an electronic device configurable to use a diffuser to implement a plurality of flash modes, according to at least some embodiments. An electronic device may comprise a diffuser positioned along the light path from a flash device to the exterior surroundings, as well as a camera in the depicted embodiment. The camera may or may not have its own diffuser separate from the flash diffuser. In some embodiments the techniques illustrated in FIG. 21 may be used with standalone or external flash devices. Instructions executed on one or more processors of the electronic device may determine a default appearance setting for the flash diffuser, i.e., the appearance to be provided when the flash is not in use (element 2101). The instructions may initiate the generation of signals to the flash diffuser to implement the desired default appearance (element 2104), such as a desired color or a desired opacity.

The instructions may determine that the camera is to be used in a photography mode (element 2107) at some point in time. Input about the scene to be photographed may be obtained from a variety of sources (element 2110), such as one or more ambient light sensors (e.g., either a camera being used in ALS mode or a non-camera based ALS), image analysis software or hardware modules, proximity sensors, face recognizers, motion detectors, orientation sensors, or other hardware or software modules). Based on the input, one or more characteristics of the flash mode to be implemented may be determined (element 2113)—e.g., whether the illumination is to be tightly centered or more diffusely spread, which (if any) parts of the scene need to be illuminated more strongly than others, whether fill-flash is to be used, what types (if any) of flash steering are to be performed, and so on. The appropriate signals may then be generated such that the illumination provided by the flash through the flash diffuser is modified according to the selected flash mode (element 2116).

Example Components of Electronic Device

Figure 22:
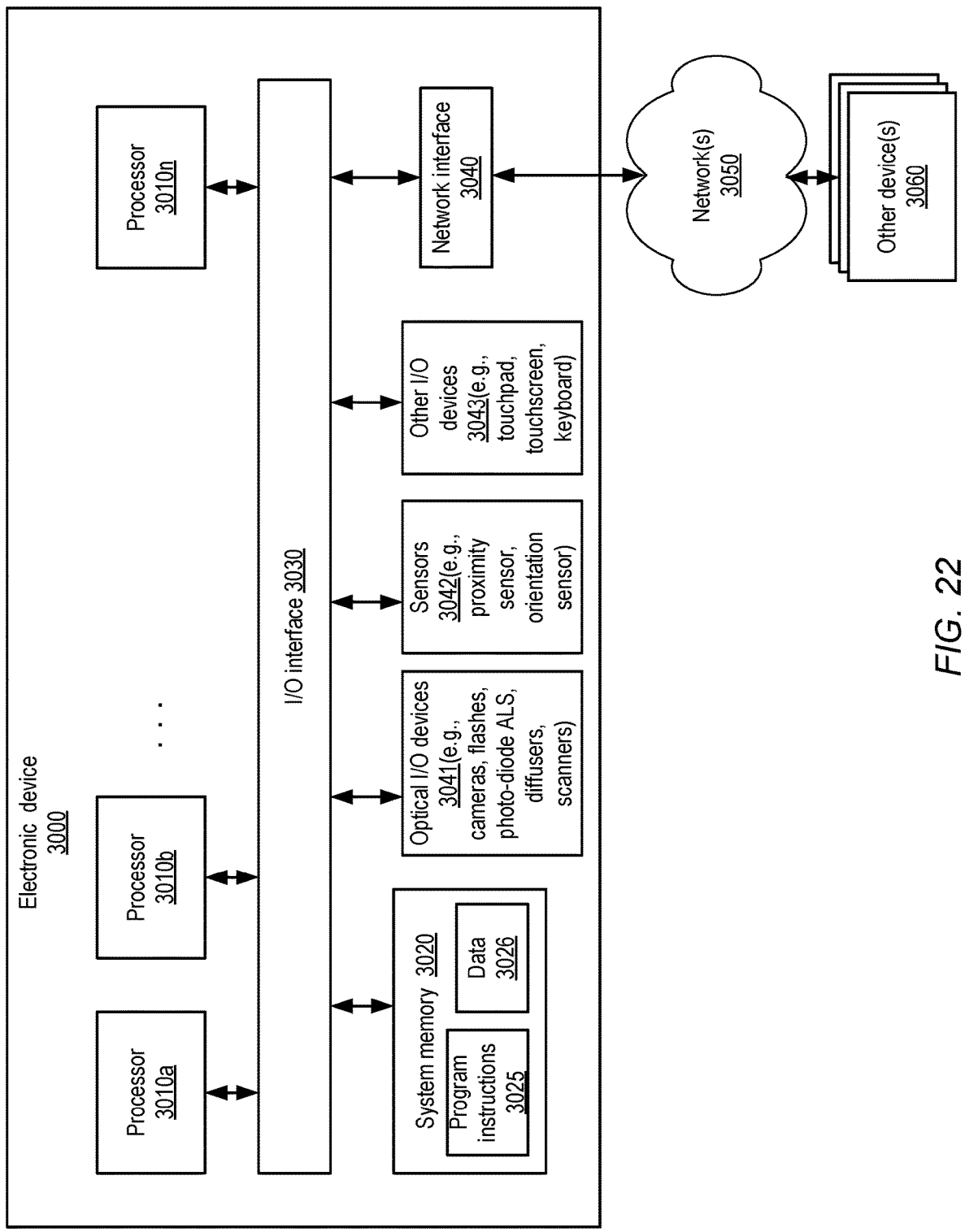
FIG. 22 illustrates components of an example electronic device configured to utilize one or more diffusers, according to at least some embodiments.

FIG. 22 illustrates components of an example electronic device configured to utilize one or more diffusers for one or more of the types of functions described above, according to at least some embodiments. It is noted that FIG. 22 shows only an overview of a subset of the components that may be included in the electronic device in some embodiments—for example, telephony-related components that may be included in a smart phone are not illustrated. It is also noted that any of the actions or features described with respect to FIG. 1 through FIG. 21 may be implemented using an electronic device configured as shown in FIG. 22, according to various embodiments.

In the illustrated embodiment, device 3000 includes one or more processors 3010 coupled to a system memory 3020 via an input/output (I/O) interface 3030. Device 3000 further includes a network interface 3040 coupled to I/O interface 3030, and one or more optical devices 3041, sensors 3042, and additional I/O devices 3043. Optical devices 3041 may include, for example, any combination of one or more diffusers, digital cameras, flashes, photodiode based ambient light sensors, scanners, and/or other optical devices. Sensors 3042 may include, for example, proximity sensors, motion detectors, orientation sensors, or other types of sensors for detecting various aspects of the electronic device environment. I/O devices 3043 may include, for example, touch pads, touch screens, displays, keyboards, and the like. In some cases, it is contemplated that embodiments may be implemented using a single instance of electronic device 3000, while in other embodiments multiple such devices may be configured to host different portions or instances of embodiments. For example, in one embodiment some of the functionality may be implemented using one instance of an electronic device, while other portions of the functionality may be implemented using other instances of the electronic devices that are distinct from the first instance.

In various embodiments, electronic device 3000 may be a uniprocessor system including one processor 3010, or a multiprocessor system including several processors 3010 (e.g., two, four, eight, or another suitable number). Processors 3010 may be any suitable processor capable of executing instructions. For example, in various embodiments processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions or code 3025 and/or data 3026 accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions 3025 may be configured to implement one or more analysis and detection modules incorporating any of the functionality described above. Additionally, data 3026 of memory 3020 may include various types of information such as mappings between signals and optical properties of various diffusers, user-specified settings for privacy indicators or message displays, and the like. In some embodiments, program instructions and/or data may be received, sent or stored upon different types of computer-accessible media or on similar media separate from system memory 3020 or electronic device 3000. While electronic device 3000 is described as implementing the functionality of functional blocks of previous figures, any of the functionality described herein may be implemented via such a computer system.

In one embodiment, I/O interface 1030 may be configured to coordinate I/O traffic between processor 3010, system memory 3020, and any peripheral devices in the device, including network interface 3040 or other interfaces, such as input/output devices 3041, 3042 or 3043. In some embodiments, I/O interface 3030 may perform any necessary protocol, timing or other data transformations to convert data signals from one component (e.g., system memory 3020) into a format suitable for use by another component (e.g., processor(s) 3010, or diffuser(s) 3041). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between device 3000 and other devices attached to a network 3050 (e.g., carrier or agent devices) or between nodes of electronic device 3000. Network 3050 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 3040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 3043 may, in some embodiments, include one or more display terminals, keyboards, keypads, touchpads, microphones, speakers, voice recognition devices, or any other devices suitable for entering or accessing data by one or more electronic devices 3000. Input/output devices 3041, 3042 or 3043 may be present in electronic device 3000 or may be distributed on various nodes of a multi-node electronic device 3000. In some embodiments, similar input/output devices may be separate from device 3000 and may interact with one or more nodes of device 3000 through a wired or wireless connection, such as over network interface 3040.

As shown in FIG. 22, memory 3020 may include program instructions 3025, which may be processor-executable to implement any element or action described above. In one embodiment, the program instructions may implement the methods described above, such as the methods illustrated by FIG. 15-FIG. 22. In other embodiments, different elements and data may be included. Note that data 3026 may include any data or information described above. In some embodiments, the electronic device 3000 may comprise a general-purpose computer system such as a laptop, desktop, or server computer system.

Those skilled in the art will appreciate that electronic device 3000 is merely illustrative and is not intended to limit the scope of embodiments. In particular, the devices may include any combination of hardware or software that can perform the indicated functions, including computers, network devices, Internet appliances, PDAs, wireless phones, tablets, smart TVs, pagers, etc. Electronic device 3000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated electronic device via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from electronic device 3000 may be transmitted to electronic device 3000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. An electronic device, comprising:
   a memory;
   one or more processors,
   a camera;
   a flash unit, comprising:
      one or more flash illumination sources; and
      a diffuser layer comprising one or more controllable diffuser sections, wherein the diffuser layer is situated such that an outward light path from the one or more flash illumination sources passes through the diffuser layer;
   a camera window for the camera comprising one or more additional independently controllable diffuser sections,
   wherein the program instructions, when executed by the one or more processors, cause the one or more processors to:
      adjust a level of diffusion of light passing outward through the diffuser layer of the flash unit; and
      adjust a level of diffusion of light passing through the one or more additional independently controllable diffuser sections of the camera window.

2. The electronic device as recited in claim 1, wherein the one or more controllable diffuser sections of the flash unit comprise one or more of: (a) a polymer dispersed liquid crystal (PDLC) device, (b) a curved metal blind deposited on a glass substrate, (c) a photochromic thin film, or (d) a suspended particle device.

3. The electronic device as recited in claim 1, wherein the electronic device is one or more of: (a) a digital camera, (b) a mobile phone, (c) a tablet computer, (d) a personal computer, or (e) a laptop computer.

4. The electronic device as recited in claim 1, further comprising a touch screen, wherein the camera window is a front camera window, and wherein the one or more additional independently controllable diffuser sections of the front camera window are coupled to the touch screen.

5. The electronic device as recited in claim 4, wherein the touch screen further comprises a top bezel, two side bezels, and a bottom bezel, wherein the one or more additional independently controllable diffuser sections of the front camera window are attached to one of: (a) the top bezel, (b) a side bezel of the two side bezels, or (c) the bottom bezel.

6. The electronic device as recited in claim 1, further comprising a touch screen, wherein the one or more additional independently controllable diffuser sections of the camera window are attached to a side of the electronic device opposite a side on which the touch screen is mounted.

7. The electronic device of claim 1, further comprising:
an ambient light sensor configured to measure ambient light passing through the camera window,
wherein the program instructions, when executed by the one or more processors, cause the one or more processors to:
determine the camera is to be used to capture an image of a scene; and
cause, prior to the image being captured of the scene, the level of diffusion of light passing through the one or more additional independently controllable diffuser sections of the camera window to be adjusted such that the ambient light sensor is enabled to measure an ambient light condition of the scene.

8. The electronic device of claim 7, wherein the program instructions, when executed by the one or more processors, cause the one or more processors to:
determine a set of two or more levels of diffusion to be applied to two or more of the controllable diffuser sections of the diffuser layer of the flash unit based, at least in part, on ambient light measured in a foreground of the scene and based, at least in part, on ambient light measured in a background of the scene.

9. A non-transitory computer-readable medium storing program instructions that, when executed by one or more processors, cause the one or more processors to:
determine a camera associated with a flash unit is not in use, wherein the camera and the flash unit are included in a camera window; and
cause a diffuser section for the camera window to be adjusted from a transparent level of diffusion to an opaque level of diffusion, wherein the diffuser section for the camera window is controllable independent of one or more diffuser sections for the flash unit, and
wherein light directed towards the diffuser section for the camera window at the opaque level of diffusion is scattered to a first extent and light directed towards the diffuser section for the camera window at the transparent level of diffusion is scattered to a lesser extent.

10. The non-transitory computer-readable medium storing program instructions as recited in claim 9, wherein the program instructions, when executed by the one or more processors, cause the one or more processors to:
determine the camera associated with the flash unit is to be put in use; and
cause the diffuser section for the camera window to be adjusted from the opaque level of diffusion to the transparent level of diffusion.

11. The non-transitory computer-readable medium storing program instructions as recited in claim 10, wherein the program instructions, when executed by the one or more processors, cause the one or more processors to:
determine the camera to be put in use is located on a side of an electronic device opposite a touch screen, wherein the camera window is a front camera window.

12. The non-transitory computer-readable medium storing program instructions as recited in claim 10, wherein the program instructions, when executed by the one or more processors, cause the one or more processors to:
determine the camera to be put in use is located on a same side of an electronic device as a touch screen, wherein the camera window is an outward facing camera window.

13. The non-transitory computer-readable medium storing program instructions as recited in claim 9, wherein the program instructions, when executed by the one or more processors, cause the one or more processors to:
receive sensor data indicating ambient light in a foreground and a background of a scene in a view of the camera;
determine two or more levels of diffusion to be applied based, at least in part, on levels of ambient light in the foreground and the background of the scene; and
cause the one or more diffuser sections for the flash unit to adjust to the determined two or more diffusion levels, wherein the diffuser sections for the flash unit are independently controllable.

14. The non-transitory computer-readable medium storing program instructions as recited in claim 9, wherein the program instructions, when executed by the one or more processors, cause the one or more processors to:
adjust a level of diffusion of light passing outward through the diffuser layer of the flash unit.

15. The non-transitory computer-readable medium as recited in claim 14, wherein the level of diffusion for the flash unit is adjusted independently from a level of diffusion for the diffuser section for the camera window.

16. A method, comprising:
determining a camera associated with a flash unit is not in use, wherein the camera and the flash unit are included in a camera window; and
causing a diffuser section for the camera window to be adjusted from a transparent level of diffusion to an opaque level of diffusion, wherein the diffuser section for the camera window is controllable independent of one or more diffuser sections for the flash unit, and
wherein light directed towards the diffuser section for the camera window at the opaque level of diffusion is scattered to a first extent and light directed towards the diffuser section for the camera window at the transparent level of diffusion is scattered to a lesser extent.

17. The method of claim 16, comprising:
determining the camera associated with the flash unit is to be put in use; and
causing the diffuser section for the camera window to be adjusted from the opaque level of diffusion to the transparent level of diffusion.

18. The method of claim 17, further comprising:
determining the camera to be put in use is located on a side of an electronic device opposite a touch screen attached to the electronic device.

19. The method of claim 17, further comprising:
determine the camera to be put in use is located on a same side of an electronic device as a touch screen of the electronic device.

20. The method of claim 16, comprising:
determining two or more levels of diffusion to be applied; and
causing the one or more diffuser sections for the flash unit to adjust to the determined two or more diffusion levels, wherein the diffuser sections for the flash unit are independently controllable.

* * * * *